(12) United States Patent
Konda

(10) Patent No.: US 7,424,011 B2
(45) Date of Patent: Sep. 9, 2008

(54) REARRANGEABLY NONBLOCKING MULTICAST MULTI-STAGE NETWORKS

(75) Inventor: Venkat Konda, San Jose, CA (US)

(73) Assignee: Teak Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/999,757

(22) Filed: Nov. 27, 2004

(65) Prior Publication Data

US 2005/0117573 A1    Jun. 2, 2005

Related U.S. Application Data

(63) Continuation of application No. 09/967,815, filed on Sep. 27, 2001, now Pat. No. 6,885,669.

(51) Int. Cl.
*H04Q 11/00* (2006.01)

(52) U.S. Cl. ............... 370/388; 370/351; 370/357; 370/386; 340/2.2; 340/2.22; 340/2.21; 340/2.28; 379/306

(58) Field of Classification Search .......... 370/388, 370/380, 390, 351, 357, 386; 340/2.21, 2.2, 340/2.22, 2.28; 379/306
See application file for complete search history.

(56) References Cited

U.S. PATENT DOCUMENTS

| | | | |
|---|---|---|---|
| 3,980,834 A | 9/1976 | Akiyama et al. |
| 4,038,638 A | 7/1977 | Hwang |
| 4,566,007 A | 1/1986 | Richards |
| 5,023,864 A | 6/1991 | Cloonan et al. |
| 5,179,551 A | 1/1993 | Turner |
| 5,276,425 A | 1/1994 | Swanson et al. |
| 5,291,477 A | 3/1994 | Liew |
| 5,451,936 A | 9/1995 | Yang et al. |
| 5,544,160 A | 8/1996 | Cloonan et al. |
| 5,801,641 A | 9/1998 | Yang et al. |

OTHER PUBLICATIONS

V.E. Benes, "Mathematical Theory of Connecting Networks and Telephone Traffic" (Academic Press, 1965).

Y. Yang, and G.M., Masson, "Nonblocking Broadcast Switching Networks" IEEE Transactions on Computers, vol. 40, No. 9, Sep. 1991.

G. M. Masson & B. W. Jordan, "Generalized Multi-Stage Connection Networks" Networks, 2: pp. 191-209, 1972 by John Wiley and Sons, Inc.

(Continued)

*Primary Examiner*—Brian Zimmerman
*Assistant Examiner*—Vernal Brown
(74) *Attorney, Agent, or Firm*—Cooley Godward Kronish LLP

(57) ABSTRACT

A rearrangeably nonblocking multicast network includes an input stage having $r_1$ switches and $n_1$ inlet links for each of $r_1$ switches, an output stage having $r_2$ switches and $n_2$ outlet links for each of $r_2$ switches. The network also has a middle stage of m switches, and each middle switch has at least one link connected to each input switch for a total of at least $r_1$ first internal links and at least one link connected to each output switch for a total of at least $r_2$ second internal links, where $m \geq n_1 + n_2$. The network has all multicast connections set up such that each multicast connection passes through at most two middle switches to be connected to the destination outlet links.

18 Claims, 29 Drawing Sheets

OTHER PUBLICATIONS

F. K. Hwang, "Rearrangeability of Multi-Connection Three-Stage Clos Networks", Networks, 2: pp. 301-306, 1972 by John Wiley and Sons, Inc.

Gaylord W. Richards and Frank K. Hwang, "A Two-Stage Rearrangeable Broadcast Switching Network". IEEE Transactions on Communications, vol. COM-33, No. 10, Oct. 1985, pp. 1025.

Charles Clos "A Study of Non-Blocking Switching Networks", The Bell System Technical Journal, vol. XXXII, Jan. 1953, No. 1, pp. 406-424.

D.S. Kim, and D. Du, "Performance of Split Routing Algorithm for three-stage multicast networks", IEEE/ACM Transactions on Networking, vol. 8, No. 4, Aug. 2000.

F.K. Hwang, "Three-stage multiconnection networks which are nonblocking in the wide sense", The Bell systems technical journal, vol. 58, No. 10, Dec. 1979.

D. G. Cantor, "On Non-blocking Switching Networks", Networks, 1: pp. 367-377, 1972 by John Wiley and Sons, Inc.

F. K. Hwang and A. Jajszczyk, "On nonblocking multiconnection networks," IEEE Trans. Communications, vol. COM-34, pp. 1038-1041, 1986.

G. M. Masson, "Binomial switching networks for concentration and distribution," IEEE Trans. Communications, vol. COM-25, pp. 873-884, 1977.

G.M. Masson, "Upper Bounds on Fanout in Connection Networks", IEEE Transactions on Circuit Theory, vol. CT-20 No. 3, May 1973.

REARRANGEABLY NONBLOCKING MULTICAST MULTI-STAGE NETWORKS

CROSS REFERENCE TO RELATED APPLICATIONS

This is a continuation application and claims priority of U.S. patent application Ser. No. 09/967,815 entitled "REARRANGEABLY NON-BLOCKING MULTICAST MULTI-STAGE NETWORKS" by Venkat Konda assigned to the same assignee as the current application and filed Sep. 27, 2001 now U.S. Pat. No. 6,885,669, which is incorporated by reference in its entirety.

This application is related to and incorporates by reference in its entirety the related U.S. patent application Ser. No. 09/967,106 entitled "STRICTLY NON-BLOCKING MULTICAST MULTI-STAGE NETWORKS" by Venkat Konda assigned to the same assignee as the current application, filed on 27, Sep. 2001, and its Continuation Application U.S. patent application Ser. No. 10/999,649 filed concurrently.

CROSS REFERENCE TO CD-ROM APPENDIX

Appendix A includes software written in the C programming language for a prototype of a scheduling method and a rearrangement method to set up connections through a three-stage network. The C code is compilable by Visual C++ compiler, version 6.0 available from Microsoft Corporation, to form an executable file for use in an IBM compatible personal computer. Appendix A also includes documentation in a readme file for the C code and also instructions on how to compile and execute the C code.

```
                        cddir
Volume in drive D is 010925_1558
Volume Serial Number is FFC7-6B58
Directory of D:\
09/25/01    03:58p      <DIR>
09/25/01    03:58p      <DIR>
09/25/01    03:58p      <DIR>     M-1215~1
              3 File(s)      0 bytes
Directory of D:\M-1215~1
09/25/01    03:58p      <DIR>
09/25/01    03:58p      <DIR>
09/21/01    11:22a                30,436 OUT1.RTF
09/21/01    11:36a                 1,726 README.TXT
09/21/01    11:34a                30,285 RNB.C
              5 File(s)           62,447 bytes
Total Files Listed:
              8 File(s)           62,447 bytes
                                       0 bytes free
```

A portion of the disclosure of this patent document contains material which is subject to copyright protection. The copyright owner has no objection to the facsimile reproduction by anyone of the patent document or patent disclosure, as it appears in the U.S. Patent and Trademark Office patent files or records, but otherwise reserves all copyrights whatsoever.

BACKGROUND OF INVENTION

As is well known in the art, a Clos switching network is a network of switches configured as a multi-stage network so that fewer switching points are necessary to implement connections between its inlet links (also called "inputs") and outlet links (also called "outputs") than would be required by a single stage (e.g. crossbar) switch having the same number of inputs and outputs. Clos networks are very popularly used in digital crossconnects, switch fabrics and parallel computer systems. However Clos networks may block some of the connection requests.

There are generally three types of nonblocking networks: strictly nonblocking; wide sense nonblocking; and rearrangeably nonblocking (See V. E. Benes, "Mathematical Theory of Connecting Networks and Telephone Traffic" Academic Press, 1965 that is incorporated by reference, as background). In a rearrangeably nonblocking network, a connection path is guaranteed as a result of the network's ability to rearrange prior connections as new incoming calls are received. In strictly nonblocking network, for any connection request from an inlet link to some set of outlet links, it is always possible to provide a connection path through the network to satisfy the request without disturbing other existing connections, and if more than one such path is available, any path can be selected without being concerned about realization of future potential connection requests. In wide-sense nonblocking networks, it is also always possible to provide a connection path through the network to satisfy the request without disturbing other existing connections, but in this case the path used to satisfy the connection request must be carefully selected so as to maintain the nonblocking connecting capability for future potential connection requests.

U.S. Pat. No. 5,451,936 entitled "Non-blocking Broadcast Network" granted to Yang et al. is incorporated by reference herein as background of the invention. This patent describes a number of well known nonblocking multi-stage switching network designs in the background section at column 1, line 22 to column 3, 59.

An article by Y. Yang, and G. M., Masson entitled, "Nonblocking Broadcast Switching Networks" IEEE Transactions on Computers, Vol. 40, No. 9, September 1991 that is incorporated by reference as background indicates that if the number of switches in the middle stage, m, of a three-stage network satisfies the relation $m \geq \min((n-1)(x+r^{1/x}))$ where $1 \leq x \leq \min(n-1,r)$, the resulting network is nonblocking for multicast assignments. In the relation, r is the number of switches in the input stage, and n is the number of inlet links in each input switch. Kim and Du (See D. S. Kim, and D. Du, "Performance of Split Routing Algorithm for three-stage multicast networks", IEEE/ACM Transactions on Networking, Vol. 8, No. 4, August 2000 incorporated herein by reference) studied the blocking probability for multicast connections for different scheduling algorithms.

SUMMARY OF INVENTION

A three-stage network is operated in rearrangeably nonblocking manner, in accordance with the invention, when the number of switches in the middle stage is greater than or equal to the sum of the number of inlet links of each switch in the input stage and the number of outlet links of each switch in the output stage. In one embodiment, each connection (unicast, multicast, or broadcast) is set up through such a three-stage network by use of at most two switches in the middle stage. When the number of inlet links in each input switch is equal to the number of outlet links in each output switch, a three-stage network is operated in rearrangeably nonblocking manner in accordance with the invention, if the number of middle switches is greater than or equal to twice the number of inlet links in each input switch. Also in accordance with the invention, a three-stage network having more middle switches than the sum of the number of inlet links of each input switch and the number of outlet links of each output switch is operated in rearrangeably nonblocking manner even if some connections are set up using more than two middle switches as long as each connection has available links into at least two middle switches.

DETAILED DESCRIPTION OF THE INVENTION

The present invention is concerned with the design and operation of multi-stage switching networks for broadcast, unicast and multicast connections. When a transmitting device simultaneously sends information to more than one receiving device, the one-to-many connection required between the transmitting device and the receiving devices is called a multicast connection. A set of multicast connections is referred to as a multicast assignment. When a transmitting device sends information to one receiving device, the one-to-one connection required between the transmitting device and the receiving device is called unicast connection. When a transmitting device simultaneously sends information to all the available receiving devices, the one-to-all connection required between the transmitting device and the receiving devices is called a broadcast connection.

In general, a multicast connection is meant to be one-to-many connection, which includes unicast and broadcast connections. A multicast assignment in a switching network is nonblocking if any of the available inlet links can always be connected to any of the available outlet links. In certain multi-stage networks of the type described herein, any connection request of arbitrary fan-out, i.e. from an inlet link to an outlet link or to a set of outlet links of the network, can be satisfied without blocking if necessary by rearranging some of the previous connection requests. Depending on the number of switches in a middle stage of such a network, such connection requests may be satisfied even without rearranging as described in detail in U.S. patent application Ser. No. 09/967, 106, that is incorporated by reference above.

Figure 1A:
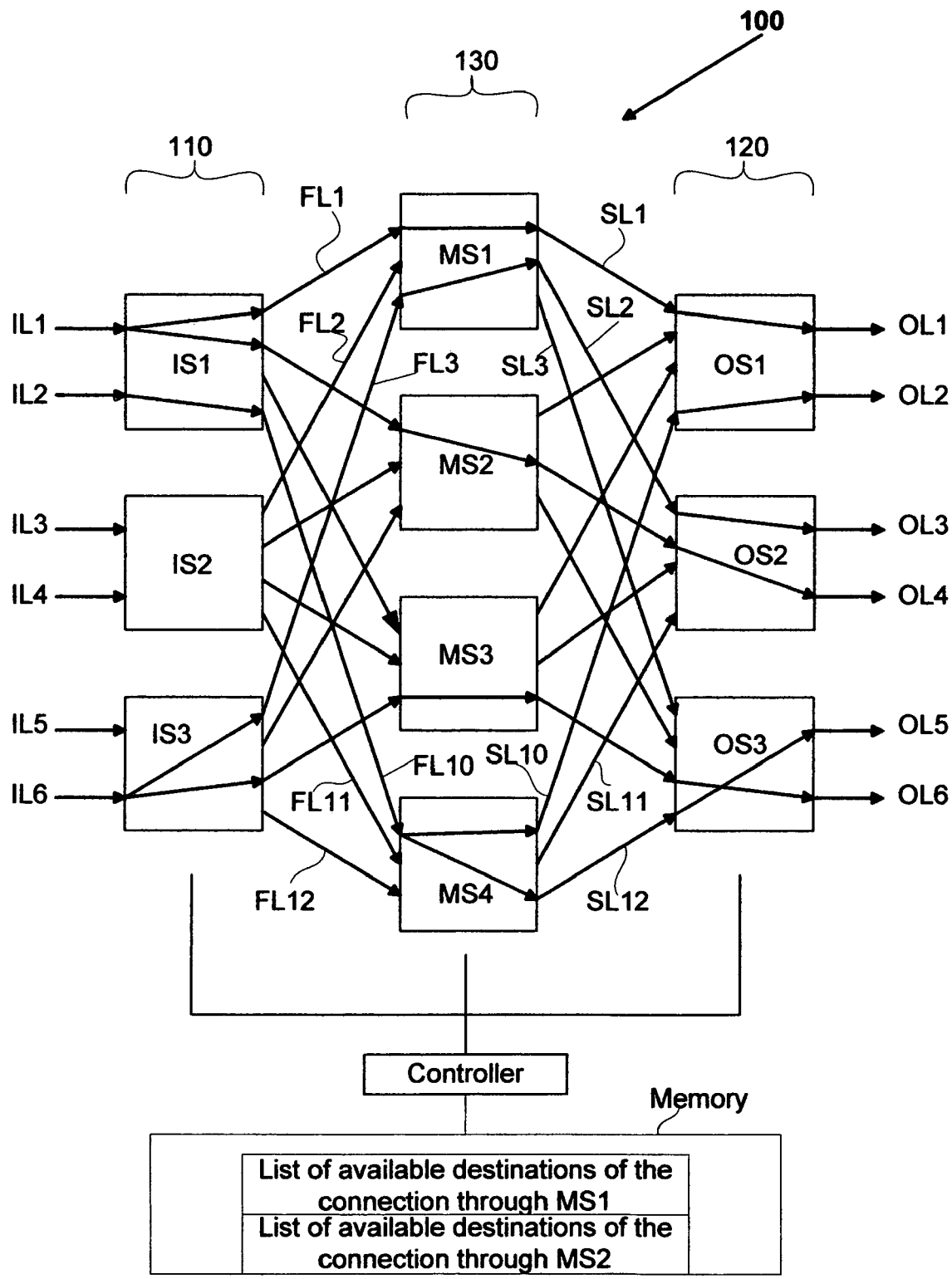
FIG. 1A is a diagram of an exemplary three-stage symmetrical network with exemplary multicast connections in accordance with the invention.

Referring to FIG. 1A, an exemplary symmetrical three-stage Clos network often switches for satisfying communication requests, such as setting up a telephone call or a data connection, between an input stage 110 and output stage 120 via a middle stage 130 is shown where input stage 110 consists of three, two by four switches IS1-IS3 and output stage 120 consists of three, four by two switches OS1-OS3, and middle stage 130 consists of four, three by three switches MS1-MS4. Such a network can be operated in rearrangeably non-blocking manner, because the number of switches in the middle stage 130 (i.e. four switches) is equal to the sum of the number of links (i.e. two inlet links) of each of the switches in the input stage 110 and output stage 120. The specific method used in implementing the rearrangeable non-blocking connectivity can be any of a number of different methods that will be apparent to a skilled person in view of the disclosure. One such method is described below in reference to FIG. 1B.

In one embodiment of this network each of the input switches IS1-IS3 and output switches OS1-OS3 are crossbar switches. When the number of stages of the network is one, the switching network is called single-stage switching network, crossbar switching network or more simply crossbar switch. A (N*M) crossbar switching network with N inlet links and M outlet links is composed of NM cross points. As the values of N and M get larger, the cost of making such a crossbar switching network becomes prohibitively expensive.

The number of switches of input stage 110 and of output stage 120 can be denoted in general with the variable r for each stage. The number of middle switches is denoted by m. The size of each input switch IS1-IS3 can be denoted in general with the notation n*m and of each output switch OS1-OS3 can be denoted in general with the notation m*n. Likewise, the size of each middle switch MS1-MS4 can be denoted as r*r. A switch as used herein can be either a crossbar switch, or a network of switches each of which in turn may be a crossbar switch or a network of switches. A three-stage network can be represented with the notation V(m,n,r), where n represents the number of inlet links to each input switch (for example the links IL1, IL2 for the input switch IS1) and m represents the number of middle switches MS1-MS4. Although it is not necessary that there be the same number of inlet links IL1-IL6 as there are outlet links OL1-OL6, in a symmetrical network they are the same. Each of the m middle switches MS1-MS4 are connected to each of r input switches through r links (hereinafter "first internal" links, for example the links FL1-FL3 connected to the middle switch MS1 from each of the input switch IS1-IS3), and connected to each of the output switches through r links (hereinafter "second internal" links, for example the links SL1-SL3 connected from the middle switch MS1 to each of the output switch OS1-OS3).

Each of the first internal links FL1-FL12 and second internal links SL1-SL12 are either available for use by a new connection or not available if currently used by an existing connection. The input switches IS1-IS3 are also referred to as the network input ports. The input stage 110 is often referred to as the first stage. The output switches OS1-OS3 are also referred to as the network output ports. The output stage 120 is often referred to as the last stage. In a three-stage network, the second stage 130 is referred to as the middle stage. The middle stage switches MS1-MS4 are referred to as middle switches or middle ports.

In one embodiment, the network also includes a controller coupled with each of the input stage 110, output stage 120 and middle stage 130 to form connections between an inlet link IL1-IL6 and an arbitrary number of outlet links OL1-OL6. In this embodiment the controller maintains in memory a pair of lists of available destinations for the connection through a pair of middle switches (e.g. MS1 and MS2 in FIG. 1A) to implement a fan-out of two. In a similar manner a set of n lists are maintained in an embodiment of the controller that uses a fan-out of n.

Figure 1B:
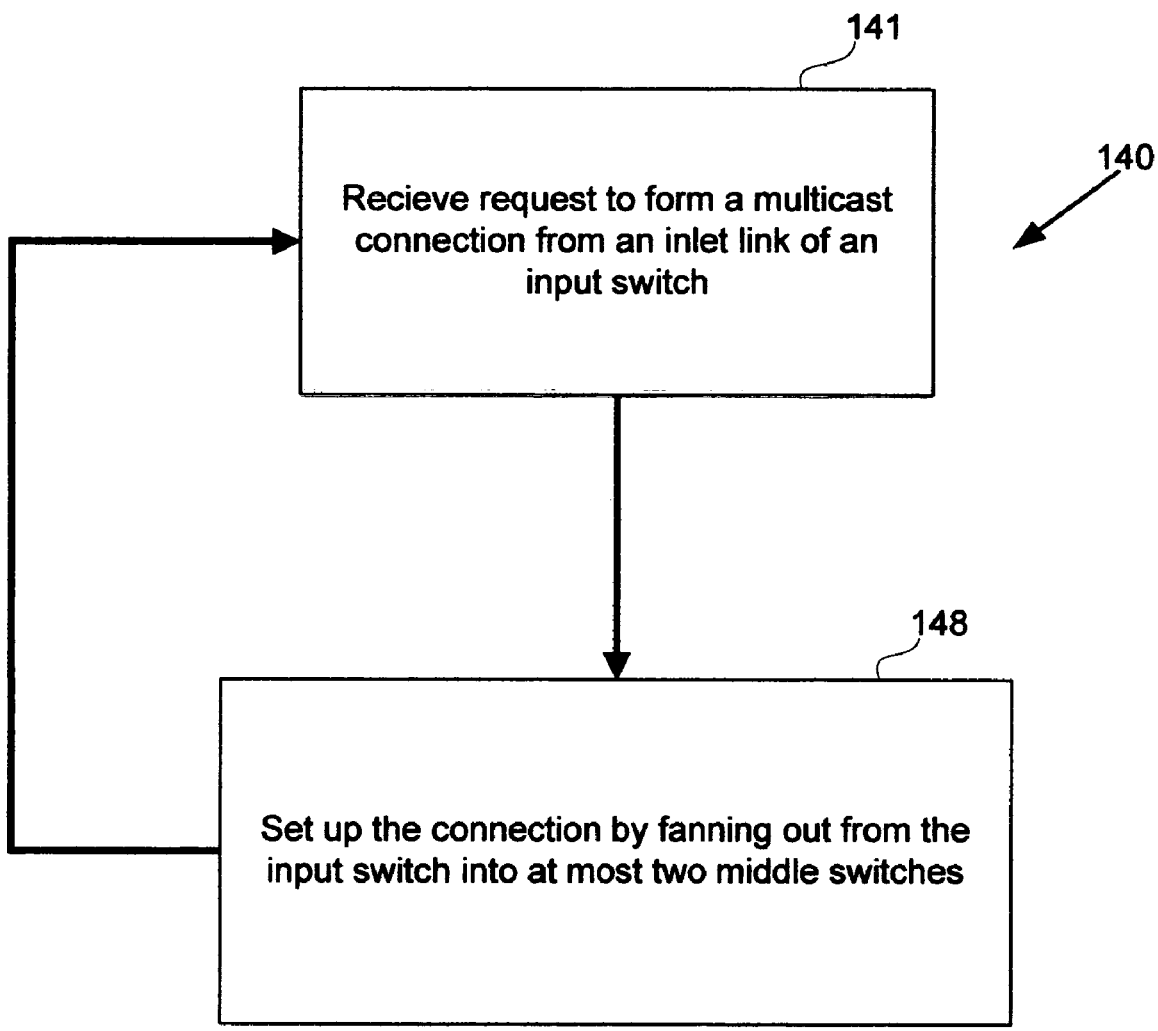
FIG. 1B is high-level flowchart of a rearrangeable scheduling method according to the invention, used to set up the multicast connections in the network 100 of FIG. 1A.

FIG. 1B shows a high-level flowchart of a scheduling method 140, in one embodiment executed by the controller of FIG. 1A. According to this embodiment, a connection request is received in act 141. Then a connection to satisfy the request is set up in act 148 by fanning out into at most two switches in middle stage 130 from its input switch.

In the example illustrated in FIG. 1A, a fan-out of four is possible to satisfy a multicast connection request if input switch is IS2, but only two middle stage switches will be used in accordance with this method. Similarly, although a fan-out of three is possible for a multicast connection request if the input switch is IS3, again only a fan-out of two is used. The specific middle switches that are chosen when selecting a fan-out of two is irrelevant to the method of FIG. 1B so long as at most two middle switches are selected to ensure that the connection request is satisfied, i.e. the destination switches identified by the connection request can be reached from the middle switches that are part of the selected fan-out. If a fan-out of two is not available, existing connections may be rearranged to set up the connection through at most two middle switches. In essence, limiting the fan-out from input switch to no more than two middle switches permits the network 100 to be operated in rearrangeably nonblocking manner in accordance with the invention.

After act 148, control is returned to act 141 so that acts 141 and 148 are executed in a loop for each connection request. According to one embodiment as shown further below it is not necessary to have more than 2*n middle stage switches in the network 100 of FIG. 1A, where the number of inlet links IL1-IL2 equals the number of outlet links OL1-OL2, both represented by the variable n for the network to be a rearrangeably nonblocking symmetrical switching network, when the scheduling method of FIG. 1B is used.

The connection request of the type described above in reference to method 140 of FIG. 1B can be unicast connection request, a multicast connection request or a broadcast connection request, depending on the example. In case of a unicast connection request, a fan-out of one is used, i.e. a single middle stage switch is used to satisfy the request. Moreover, although in the above-described embodiment a limit of two has been placed on the fan-out into the middle stage switches, the limit can be greater depending on the number of middle stage switches in a network, as discussed below in reference to FIG. 2A (while maintaining the rearrangeably nonblocking nature of operation of the network). Moreover, in method 140 described above in reference to FIG. 1B any arbitrary fan-out may be used between each middle stage switch and the output stage switches, and also any arbitrary fan-out may be used within each output stage switch, to satisfy the connection request. Moreover, although method 140 of FIG. 1B has been illustrated with examples in a ten switch network 100 of FIG. 1A, the method 140 can be used with any general network, of the type illustrated in FIGS. 2A and 2B.

Figure 2A:
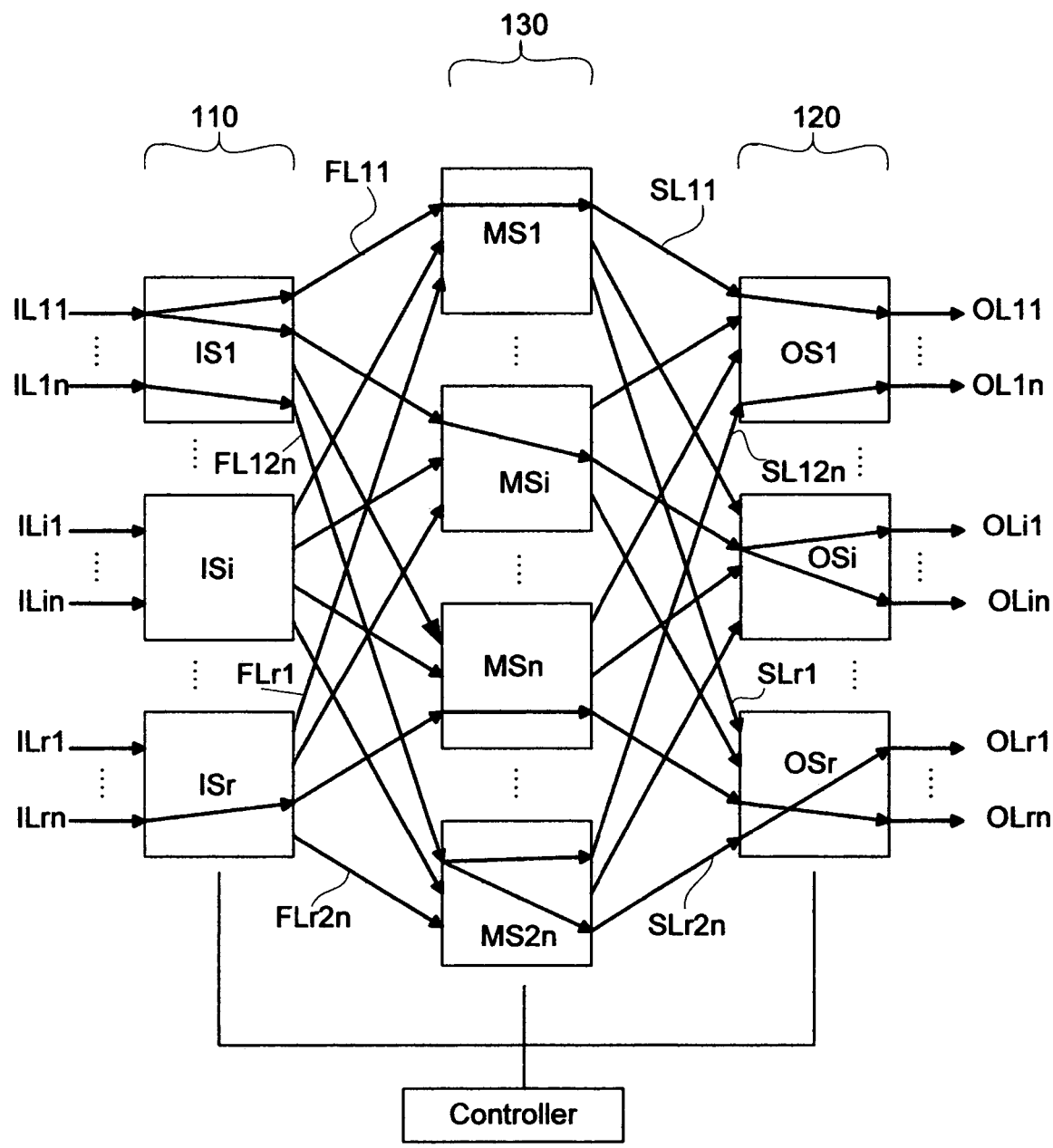
FIG. 2A is a diagram of a general symmetrical three-stage rearrangeably nonblocking network with n inlet links in each of r input stage switches and m=2*n middle stage switches that are used with the method of FIG. 1B in one embodiment.

Network of FIG. 1A is an example of general symmetrical three-stage network shown in FIG. 2A. The general symmetrical three-stage network can be operated in rearrangeably nonblocking manner if $m \geq 2*n$ (and in the example of FIG. 2A, $m=2*n$), wherein has n inlet links for each of r input switches IS1-ISr (for example the links IS11-IS1$n$ to the input switch IS1) and n outlet links for each of r output switches OS1-OSr (for example OS11-OS1$n$ to the output switch OS1). Each of the m switches MS1-MSm are connected to each of the input switches through r first internal links (for example the links FL11-FLr1 connected to the middle switch MS1 from each of the input switch IS1-ISr), and connected to each of the output switches through r second internal links (for example the links SL11-SLr1 connected from the middle switch MS1 to each of the output switch OS1-OSr). In such a general symmetrical network no more than 2*n middle stage switches MS1-MS2$n$ are necessary for the network to be rearrangeably nonblocking, when using a scheduling method of the type illustrated in FIG. 1B. Although FIG. 2A shows an equal number of first internal links and second internal links, as is the case for a symmetrical three-stage network, the present invention, however, applies even to non-symmetrical networks of the type illustrated in FIG. 2B (described next).

Figure 2B:
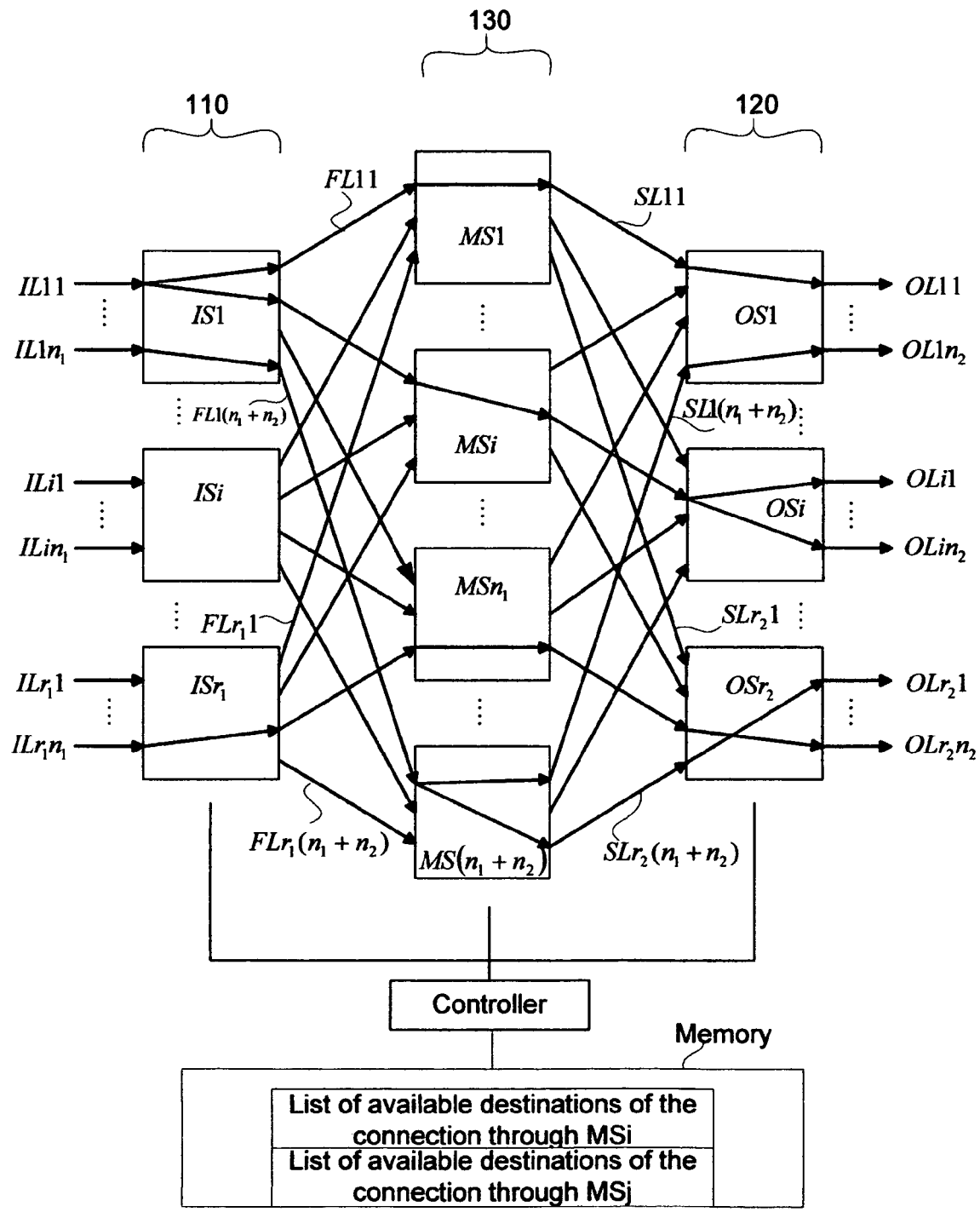
FIG. 2B is a diagram of a general non-symmetrical three-stage rearrangeably nonblocking network with $n_1$ inlet links in each of $r_1$ input stage switches, $n_2$ outlet links in each of $r_2$ output stage switches, and m=$n_1$+$n_2$ middle stage switches that are used with the method of FIG. 1B in one embodiment.

In general, an $(N_1*N_2)$ asymmetric network of three stages can be operated in rearrangeably nonblocking manner if $m \geq n_1 + n_2$ (and in the example of FIG. 2B $m = n_1 + n_2$), wherein network (FIG. 2B) has $r_1$ ($n_1*m$) switches IS1-IS$r_1$ in the first stage, m ($r_1*r_2$) switches MS1-MSm in the middle stage, and $r_2$ ($m*n_2$) switches OS1-OS$r_2$ in the last stage where $N_1 = n_1*r_1$ is the total number of inlet links and $N_2 = n_2*r_2$ is the total number of outlet links of the network. Each of the m switches MS1-MS($n_1+n_2$) are connected to each of the input switches through $r_1$ first internal links (for example the links FL11-FL$r_1$1 connected to the middle switch MS1 from each of the input switch IS1-IS$r_1$), and connected to each of the output switches through $r_2$ second internal links (for example the links SL11-SL$r_2$1 connected from the middle switch MS1 to each of the output switch OS1-OS$r_2$). Such a multi-stage switching network is denoted as a V(m,$n_1$,$r_1$,$n_2$,$r_2$) network. For the special symmetrical case where $n_1$=$n_2$=n and $r_1$=$r_2$=r, the three-stage network is denoted as a V(m,n,r) network. In general, the set of inlet links is denoted as $\{1,2,\ldots,r_1n_1\}$ and the set of output switches are denoted as O=$\{1,2,\ldots,r_2\}$. In an asymmetrical three-stage network, as shown in FIG. 2B with $n_1$ inlet links for each of $r_1$ input switches, $n_2$ outlet links for each of $r_2$ output switches, no more than $n_1$+$n_2$ middle stage switches are necessary for the network to be rearrangeably nonblocking, again when using the scheduling method of FIG. 1B. The network has all connections set up such that each connection passes through at most two middle switches to be connected to all destination outlet links.

Every switch in the multi-stage networks discussed herein has multicast capability. In a V(m,$n_1$,$r_1$,$n_2$,$r_2$) network, if a network inlet link is to be connected to more than one outlet link on the same output switch, then it is only necessary for the corresponding input switch to have one path to that output switch. This follows because that path can be multicast within the output switch to as many outlet links as necessary. Multicast assignments can therefore be described in terms of connections between input switches and output switches. An existing connection or a new connection from an input switch to r' output switches is said to have fan-out r'. If all multicast assignments of a first type wherein any inlet link of an input switch is to be connected in an output switch to at most one outlet link are realizable, then multicast assignments of a second type, wherein any inlet link of each input switch is to be connected to more than one outlet link in the same output switch, can also be realized. For this reason, the following discussion is limited to general multicast connections of the first type (with fan-out r', $1 \leq r' \leq r_2$) although the same discussion is applicable to the second type.

To characterize a multicast assignment, for each inlet link i∈$\{1,2,\ldots,r_1n_1\}$, let $I_i$=O, where O ⊂ $\{1,2,\ldots,r_2\}$, denote the subset of output switches to which inlet link i is to be connected in the multicast assignment. For example, the network of FIG. 1A shows an exemplary three-stage network, namely V(4,2,3), with the following multicast assignment $I_1$=$\{1,2\}$, $I_2$=$\{1,3\}$, $I_6$=$\{2,3\}$ and all other $I_j$=φ for j=[1-6]. It should be noted that the connection $I_1$ fans out in the first stage switch IS1 into the middle stage switches MS1 and MS2, in middle switch MS1 fans out into output switch OS1, and in middle switch MS2 fans out into output switch OS2. And in both output switches OS1 and OS2 it fans out once into the outlet links OL1 and OL4 respectively. Connection $I_2$ fans out in input switch IS1 once into middle switch MS4, where it fans out in middle switch MS4 twice into output switches OS1 and OS3, and in output switches OS1 and OS3 it fans out once into the outlet links OL2 and OL5 respectively. Finally the connection $I_2$ fans out in the input switch IS3 twice into middle switches MS1 and MS3, and from middle switch MS1 it fans out once into output switch OS2, from middle switch MS3 once into the output switch OS3, and in output switches OS2 and OS3 fans out once into the outlet links OL3 and OL6 respectively. In accordance with the invention, each connection can fan out in the first stage switch into at most two middle stage switches, and in the middle switches and last stage switches it can fan out any arbitrary number of times as required by the connection request.

Two multicast connection requests $I_i$=$O_i$ and $I_j$=$O_j$ for i≠j are said to be compatible if and only if $O_i \cap O_j$=φ. It means when the requests $I_i$ and $I_j$ are compatible, and if the inlet links i and j do not belong to the same input switch, they can be set up through the same middle switch.

Figure 3A:
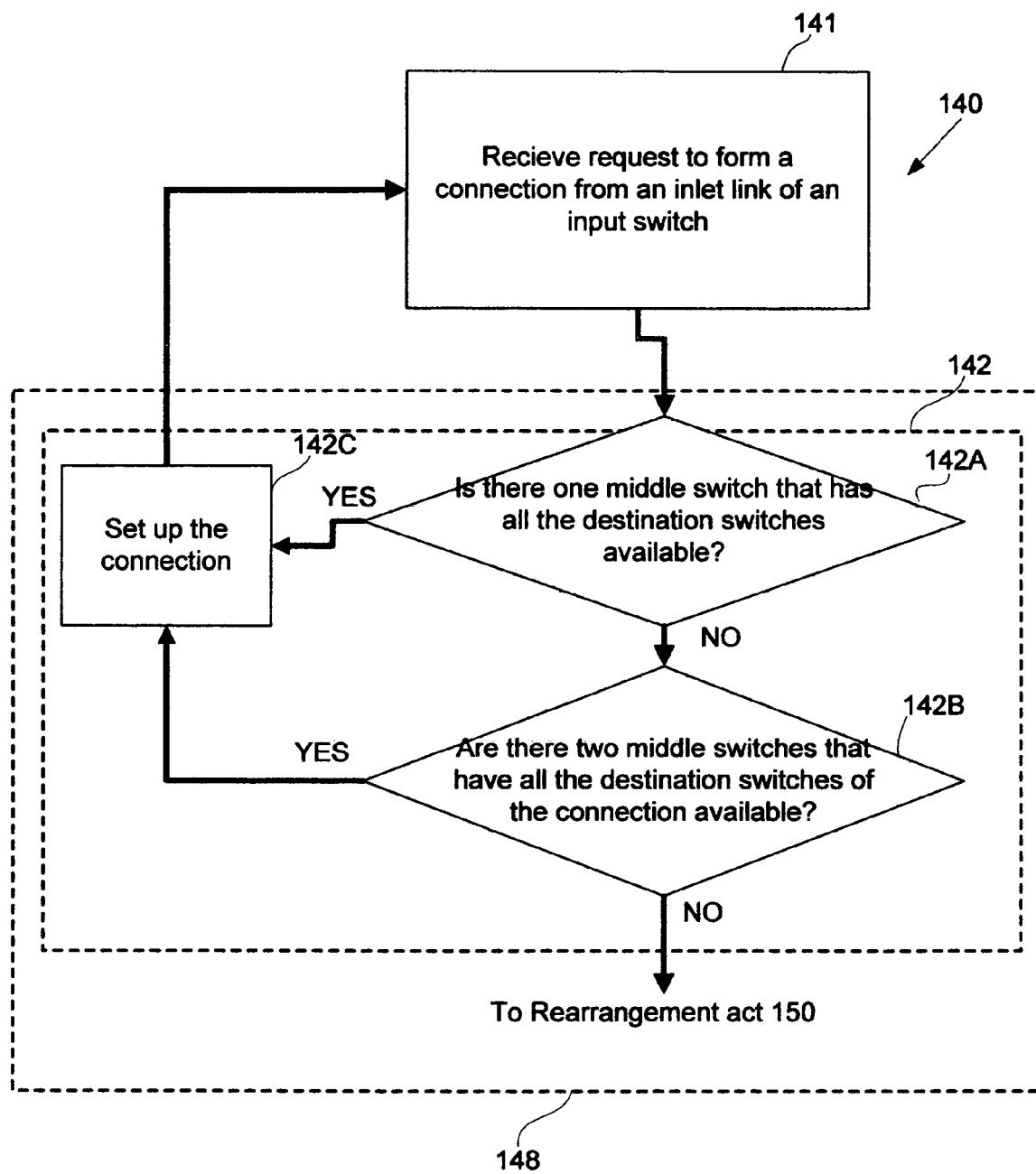
FIG. 3A is intermediate level flowchart of one implementation of the method 140 of FIG. 1B.

FIG. 3A is intermediate level flowchart of one implementation of the method of FIG. 1B. In the following "destination switch" or "destination" refers to any switch in the output stage 120 that is identified in a connection request. According to this implementation, a connection request is received in act 141. Then the method 140 checks in act 142 if the connection can be set up through only one middle switch and if act 142A finds a middle switch which has second internal links to all the destinations available then the connection is set up in act 142C and the control returns to act 141. If act 142A results in "no", the control goes to act 142B where the method 140 checks if the connection can be set up through only two middle switches. If act 142B results in "yes" act 142C sets up the connection through the two middle switches. If act 142B results in "no", the control goes to act 150 which is the rearrangement method illustrated later. Also it must be noted that act 148 consists of the scheduling act 142 and the rearrangement act 150. Therefore no more than two middle switches are used when attempting to satisfy the connection request. When the connection is set up in 142C, control returns to act 141 so that acts 141 and 142 are executed in a loop, for each connection request.

After the performance of steps 141, 142 of method 140 if act 142B results in "no" it means there are no available middle switches, at most two in number, that can be used to set up the multicast connection without the rearrangement of the existing connections. There after, in one implementation of the invention, existing connections are rearranged to set up the multicast connection. Any method well known in the art can be used to rearrange the existing connections to set up the multicast connection. One specific method of rearrangement is described below in reference to FIG. 5A.

TABLE 1

A Multicast Assignment in a V(6, 3, 9) Network

| Requests for r = 1 | Requests for r = 2 | Requests for r = 3 |
|---|---|---|
| $I_1$ = {1, 2, 3} | $I_4$ = {1, 4, 7} | $I_7$ = {1, 5, 9} |
| $I_2$ = {4, 5, 6} | $I_5$ = {2, 5, 8} | $I_8$ = {2, 6, 7} |
| $I_3$ = {7, 8, 9} | $I_6$ = {3, 6, 9} | $I_9$ = {3, 4, 8} |

Table 1 above shows a multicast assignment in V(6,3,9) network. This network has a total of twenty-seven inlet links and twenty-seven outlet links. The multicast assignment in Table 1 shows nine multicast connections, three each from the first three input switches. Each of the nine connections has a fan-out of three. For example, the connection request $I_1$ has the destinations as the output switches OS1, OS2, and OS3 (referred to as 1, 2, 3 in Table 1). Request $I_1$ only shows the output switches and does not show which outlet links are the destinations. However it can be observed that each output switch is used only three times in the multicast assignment of Table 1, using all the three outlet links in each output switch. For example, output switch 1 is used in requests $I_1$, $I_4$, $I_7$, so that all three outlet links of output switch 1 are in use, and a specific identification of each outlet link is irrelevant. And so when all the nine connections are set up all the twenty-seven outlet links will be in use.

Figure 3B:
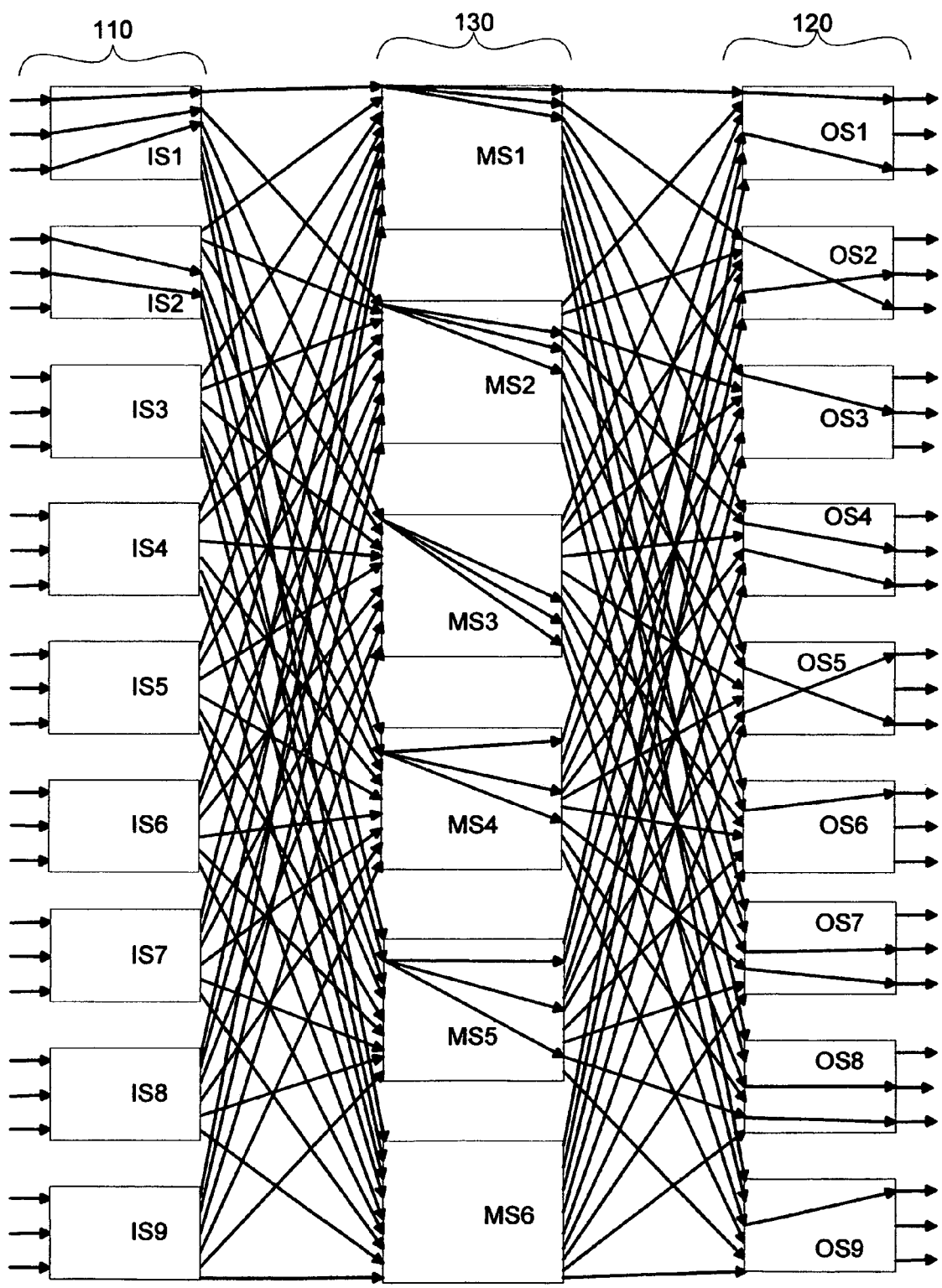
FIG. 3B shows an exemplary V(6,3,9) network with certain existing multicast connections.

FIG. 3B shows an initial state of the V(6,3,9) network in which the connections $I_1$-$I_5$ of Table 1 are previously set up. The existing connections $I_1$, $I_2$, $I_3$, $I_4$, and $I_5$ pass through the middle switches MS1, MS2, MS3, MS4, and MS5 respectively. Each of these connections is fanning out only once in the first switch and fanning out three times in each middle switch. Connection $I_1$ from input switch IS1 fans out into middle switch MS1, and from middle switch MS1 into output switches OS1, OS2, and OS3. Connection $I_2$ from input switch IS1 fans out into middle switch MS2, and from middle switch MS2 into output switches OS4, OS5, and OS6. Connection $I_3$ from input switch IS1 fans out into middle switch MS3, and from middle switch MS3 into output switches OS7, OS8, and OS9. Connection $I_4$ from input switch IS2 fans out into middle switch MS4, and from middle switch MS4 into output switches OS1, OS4, and OS7. Connection $I_5$ from input switch IS2 fans out into middle switch MS5, and from middle switch MS5 into output switches OS2, OS5, and OS8.

Figure 3C:
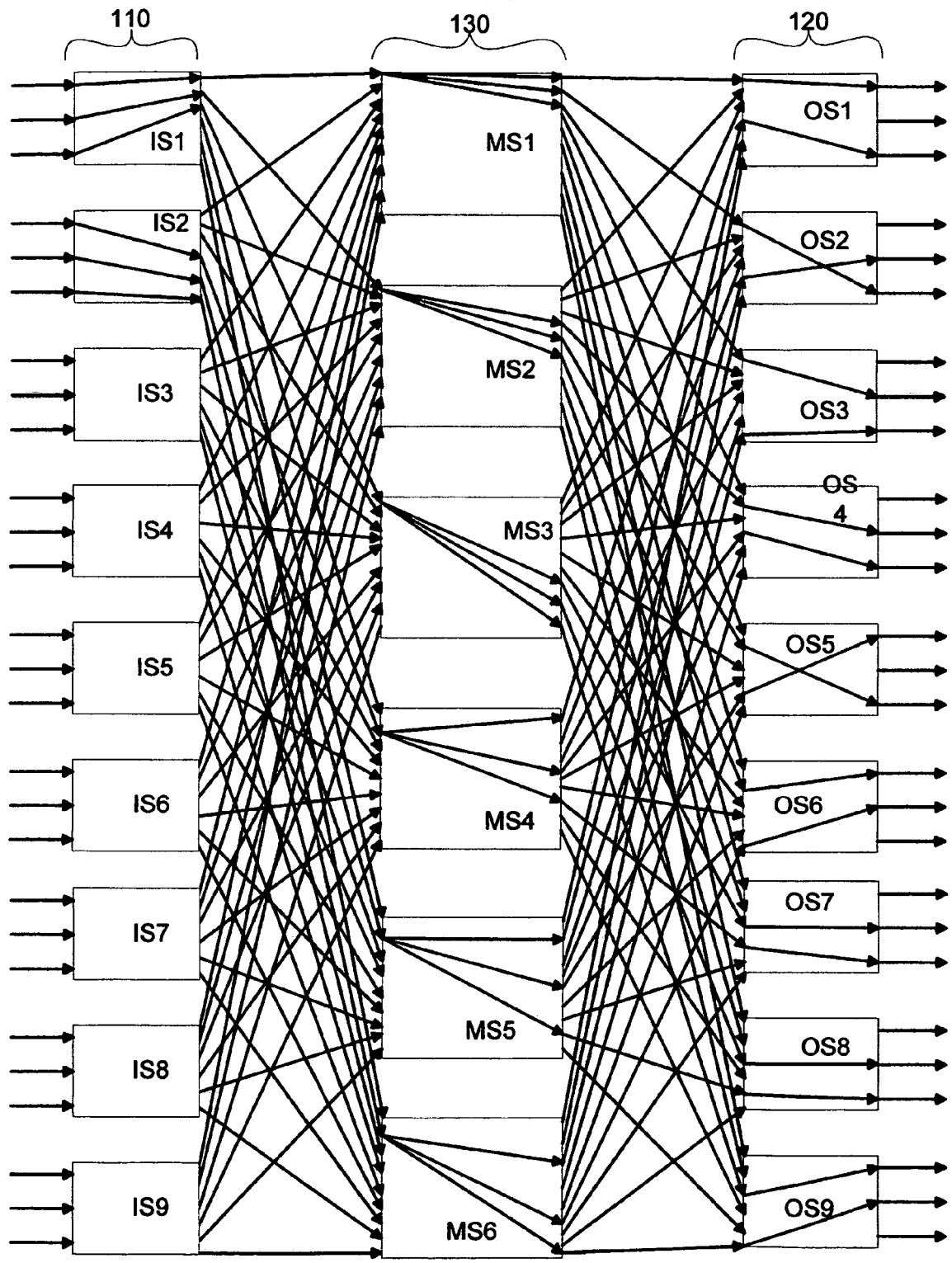
FIG. 3C shows the network of FIG. 3B after a new connection is set up by selecting one middle switch in the network, using the method of FIG. 3A in one implementation.

Method 140 of FIG. 3A next sets up a connection $I_6$ from input switch IS2 to output switches OS3, OS6 and OS9 as follows. FIG. 3C shows the state of the network of FIG. 3B after the connection $I_6$ of Table 1 is set up. In act 142A the scheduling method of FIG. 3A finds that only the middle switch MS6 is available to set up the connection $I_6$ (because all other middle switches MS1-MS5 have unavailable second internal links to at least one destination switch), and sets up the connection in act 142C through switch MS6. Therefore, Connection $I_6$ from input switch IS2 fans out only once into middle switch MS6, and from middle switch MS6 three times into output switches OS3, OS6, and OS9 to be connected to all the destinations.

Figure 3D:
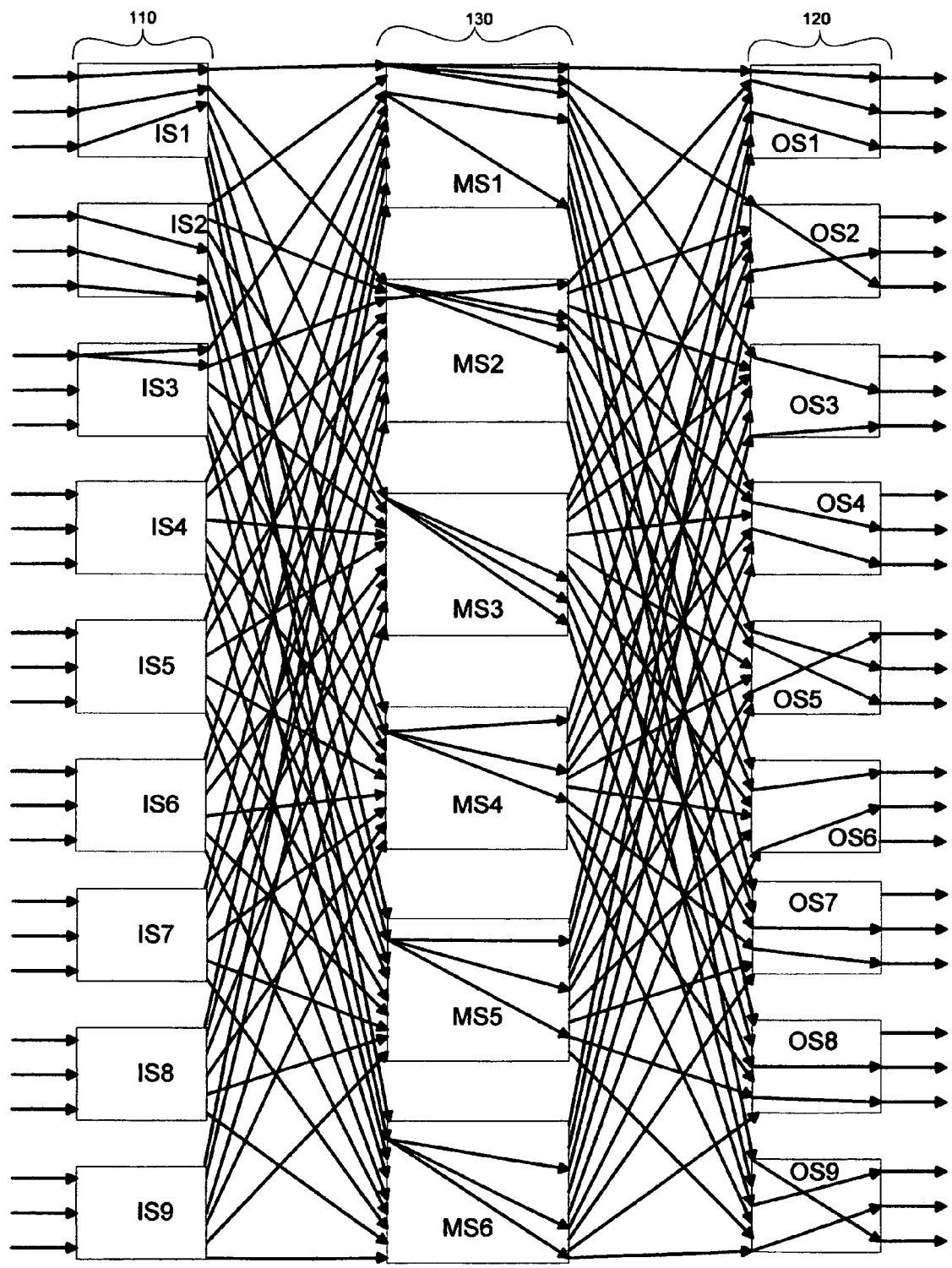
FIG. 3D shows the network of FIG. 3C after another new connection is set up by selecting two middle switches in the network, using the method of FIG. 3A in one implementation.

Method 140 next sets up a connection $I_7$ from input switch IS3 to output switches OS1, OS5 and OS9 as follows. FIG. 3D shows the state of the network of FIG. 3C after the connection $I_7$ of Table 1 is set up. The scheduling method of FIG. 3A could not find a single middle switch that has links to all required destinations available to set up the connection. However in act 142B, it finds two middle switches MS1 and MS2 to together have links to all required destinations available for the connection and accordingly the connection $I_7$ is set up in act 142C. And so connection $I_7$ fans out twice in the first switch IS3 into the middle switches MS1 and MS2. Also in the middle switch MS1 it fans out twice into output switches OS5 and OS9, and in the middle switch MS2 it fans out once into output switch OS1 to be connected to all the required destinations.

Act 142 of FIG. 3A is implemented in one embodiment by acts 242A-242D illustrated in FIG. 4. Specifically, in this embodiment, act 142A is implemented by acts 242A, 242C, and 242D wherein a loop is formed to check if a middle switch has an available link to the input switch, and also has available links to all the required destination switches. In this implementation, the same loop is also used with an additional act 242B to implement act 142B of FIG. 3A. Use of the same loop as illustrated in FIG. 4A provides efficiency by eliminating repetition of the same acts, namely acts 242A, 242C, and 242D that would otherwise have been repeated if act 142B is performed independent of act 142A (FIG. 3A). In act 242B, the method of FIG. 4A checks if another middle switch has available links to destinations that could not be reached by use of the middle switch in act 242A (described above). As illustrated in FIG. 4B, act 242B is reached when the decision in act 242A is "no". In one specific example, acts 242A-242B of FIG. 4B are implemented by use of the information developed in act 242A, for an efficient implementation as discussed next.

Figure 4A:
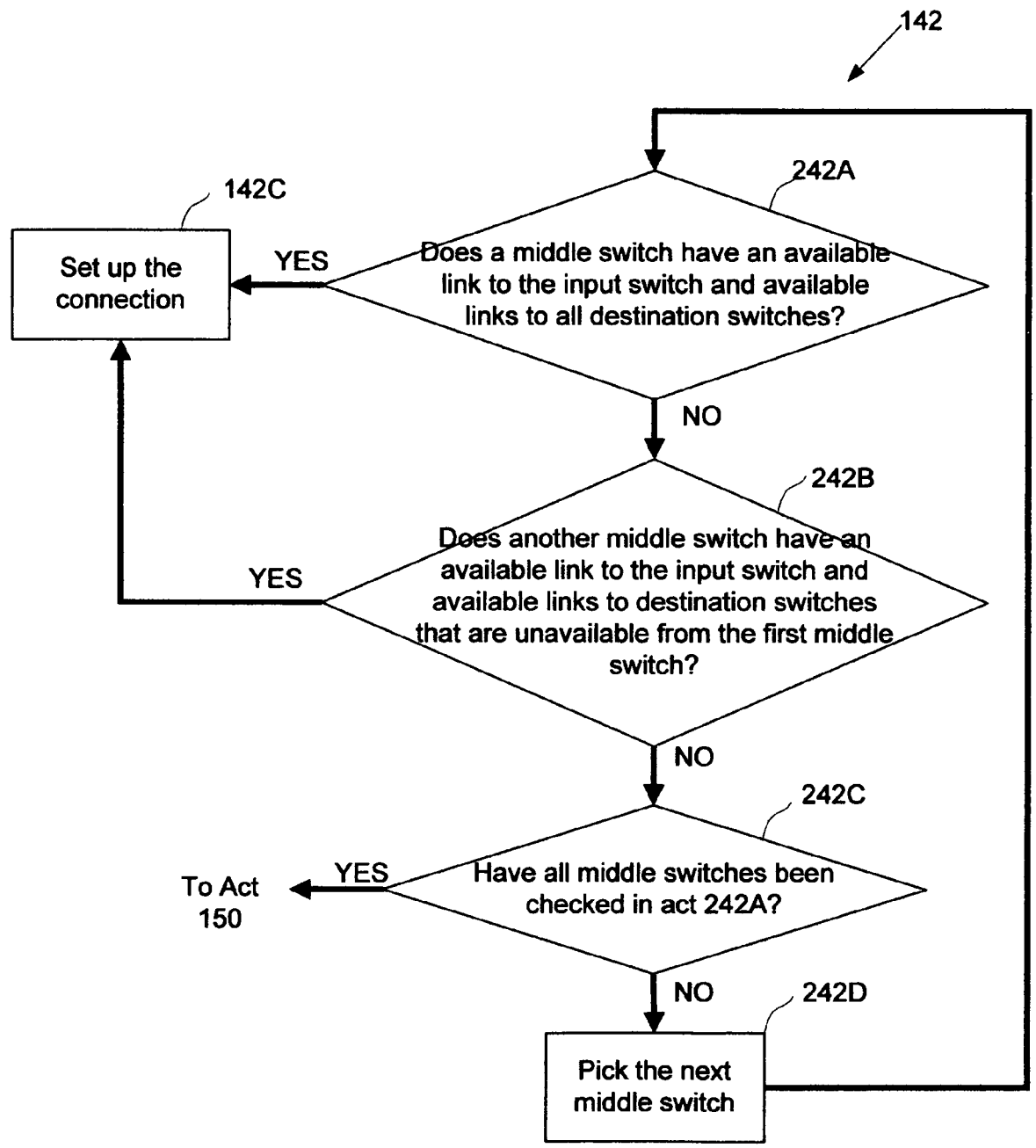
FIG. 4A is another intermediate level flowchart of one implementation of the act 142 of FIG. 3A.
Figure 4B:
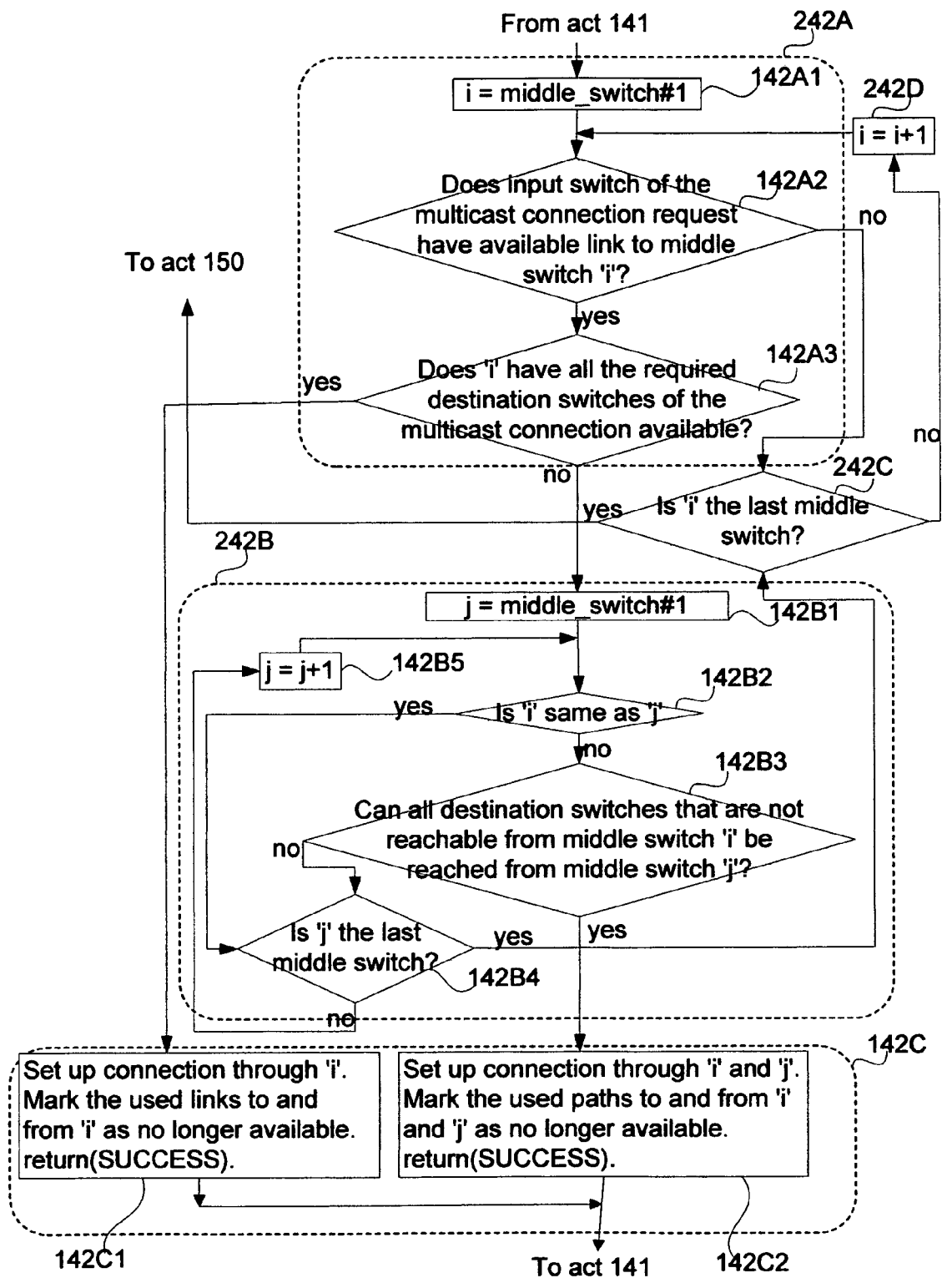
FIG. 4B is low-level flowchart of one variant of act 142 of the method of FIG. 4A.

FIG. 4B is a low-level flowchart of one variant of act 142 of FIG. 4A. The control to act 142 comes from act 141 after a connection request is received. In act 142A1, an index variable i is set to a first middle switch 1 among the group of middle switches that form stage 130 (FIG. 2B) to initialize an outer loop (formed of acts of 142A2, 142A3, 242B, 242C and 242D) of a doubly nested loop. Act 142A2 checks if the input switch of the connection has an available link to the middle switch i. If not control goes to act 242C. Else if there is an available link to middle switch i, the control goes to act 142A3. Act 142A3 checks if middle switch i has available links to all the destination switches of the multicast connection request. If so the control goes to act 142C 1 and the connection is set up through middle switch i. And all the used links from middle switch i to destination output switches are marked as unavailable for future requests. Also the method returns "SUCCESS". Act 242C checks if middle switch i is the last middle switch, if so the control goes to act 150 where the rearrangement of previous connections to set up the connection will be performed. If not the control goes to act 242D from act 242C where i is set to the next middle switch. And the outer loops next iteration starts.

If act 142A3 results in "no" the control goes to act 142B. In act 142B1 another index variable j is set to middle switch 1 to initialize an inner loop (formed of acts 142B2, 142B3, 142B4 and 142B5) of the doubly nested loop. Then the control goes to act 142B2, where the method 140 checks if middle switch j is equal to middle switch i. If middle switch j is equal to middle switch i, the control goes to act 142B4. Else if middle switch j is not equal to middle switch i, the control goes to act 142B3 where the method 140 checks if for all the destinations that have unavailable links from middle switch i have available links from middle switch j. If act 142B3 results in "yes", the connection is set up through middle switch i and middle switch j, in act 142C2. Also all the links used in act 142C2 from middle switch i and middle switch j to destination output switches for setting up the connection are marked as unavailable for future requests and the method returns "SUCCESS". If act 142B3 results in "no", the control goes to act 142B4. In act 142B4, the method 140 checks if middle switch j is last middle switch, and if so the control goes to act 142A4, if not the control goes to act 142B5 where middle switch j is set to the next middle switch. From act 142B5 the control transfers to act 142B2. And thus acts 142B2, 142B3, 142B4 and 142B5 form the inner loop stepping through all the middle switches until two middle switches are found to set up the connection. If at most two middle switches are not found through which the connection can be set up, as illustrated already the control goes from act 242C to act 150 where the rearrangement of previous connections will be tried to set up the connection.

Figure 4C:
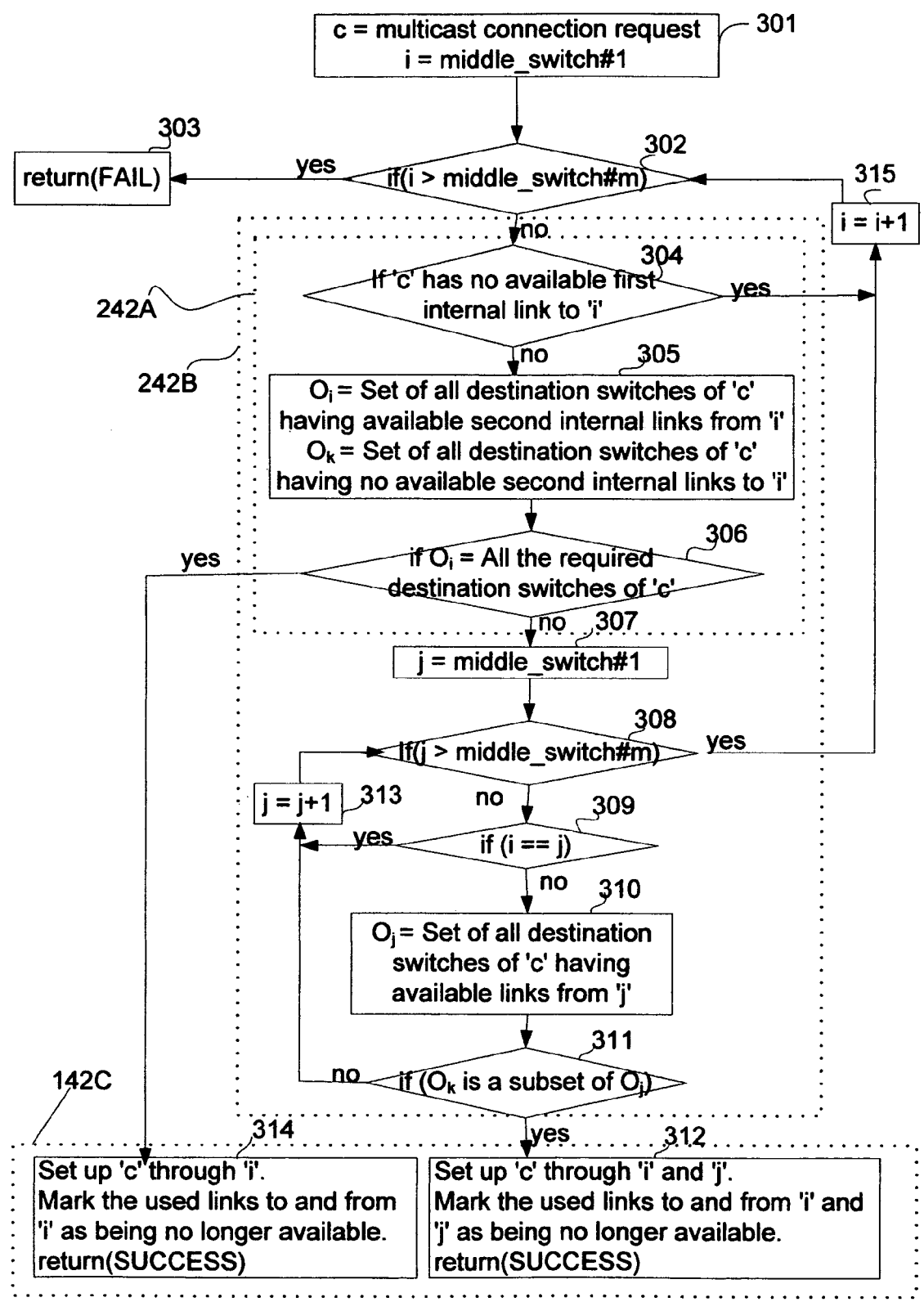
FIG. 4C illustrates, in a flowchart, pseudo code for one example of scheduling method of FIG. 4B.

FIG. 4C illustrates, in a flowchart, a computer implementation of one example of the scheduling method of FIG. 4B. The flowchart FIG. 4C is similar to the flowchart of FIG. 4B excepting for three differences. In FIG. 4C the check for setting up the connection through one middle switch also efficiently implements the half of the check for setting up the connection through two middle switches. The second difference is the loop control code. In the flowchart of FIG. 4B the loop exit test is performed at the end of the inner and outer loops whereas in the flowchart of FIG. 4C the loop exit test is performed at the beginning of the inner loop and outer loops. The third difference is in the flowchart of FIG. 4B when the connection cannot be set up in the method 142 without rearranging previous connections, the control directly goes to the rearrangement method 150 whereas in the flowchart of FIG. 4C the control returns "FAIL" and the rearrangement method need to be called separately to set up the connection.

And the following method illustrates the pseudo code for one implementation of the scheduling method of FIG. 4C to set up a new multicast connection request through the network of FIG. 2B, when there are at least $n_1+n_2$ middle switches in the network as discussed above.

Pseudo Code of the Scheduling Method:

```
Step 1:   c = current connection request;
Step 2:   for i = mid_switch_1 to mid_switch_m do {
Step 3:     if (c has no available link to i) continue;
Step 4:     O_i = Set of all destination switches
              of c having available links from i ;
Step 5:     O_k = Set of all destination switches of c
              having no available links from i ;
Step 6:     if ( O_i = All the required destination switches of c) {
              Set up c through i ;
              Mark all the used paths to and from I as unavailable;
              return ("SUCCESS");
            }
Step 7:     for j = mid_switch_1 to mid_switch_m do {
Step 8:       if (i = j) {
                continue;
              } else {
Step 9:         O_j = Set of all destination switches of c
                  having available links from j ;
Step 10:        if (O_k ⊆ O_j) {
                  Set up c through i and j;
                  Mark all the used paths to and
                  from i and j as unavailable;
                  return ("SUCCESS");
                }
              }
            }
          }
Step 11:  return("FAIL");
```

Step 1 above labels the current connection request as "c". Step 2 starts an outer loop of a doubly nested loop and steps through all the middle switches. If the input switch of c has no available link to the middle switch i, next middle switch is selected to be i in the Step 3. Steps 4 and 5 determine the set of destination switches of c having and not having available links from middle switch i, respectively. In Step 6 if middle switch i have available links to all the destination switches of connection request c, connection request c is set up through middle switch i. And all the used links of middle switch i to output switches are marked as unavailable for future requests. Also the method returns "SUCCESS". Step 7 starts the inner loop to step through all the middle switches to search for the second middle switch, and if middle switch i is same as the middle switch j, Step 8 continues to select the next middle switch to be j. Step 9 determines the set of all destination switches having available links from middle switch j. And in Step 10, if all the links that are unavailable from middle switch i are available from middle switch j, connection request c is set up through middle switch i and middle switch j. All the used links from middle switch i and middle switch j to output switches are marked as unavailable and the method returns "SUCCESS". These steps are repeated for all the pairs of middle switches. In Step 11, if one or two middle switches are not found through which c can be set up, the method returns "FAIL". It is easy to observe that that the number of steps performed by the scheduling method is proportional to $m^2$, where m is the number of middle switches in the network and hence the scheduling method is of time complexity $O(m^2)$.

Table 2 show how the steps 1-11 of the above pseudo code implement the flowchart of the method illustrated in FIG. 4C, in one particular implementation.

TABLE 2

| Steps of the pseudo code of the scheduling method | Acts of Flowchart of FIG. 4C |
|---|---|
| 1 | 301 |
| 2 | 301, 302, 315 |
| 3 | 304 |
| 4, 5 | 305 |
| 6 | 306, 314 |
| 7 | 307, 308, 313 |
| 8 | 309 |
| 9 | 310 |
| 10 | 311, 312 |
| 11 | 303 |

Figure 4D:
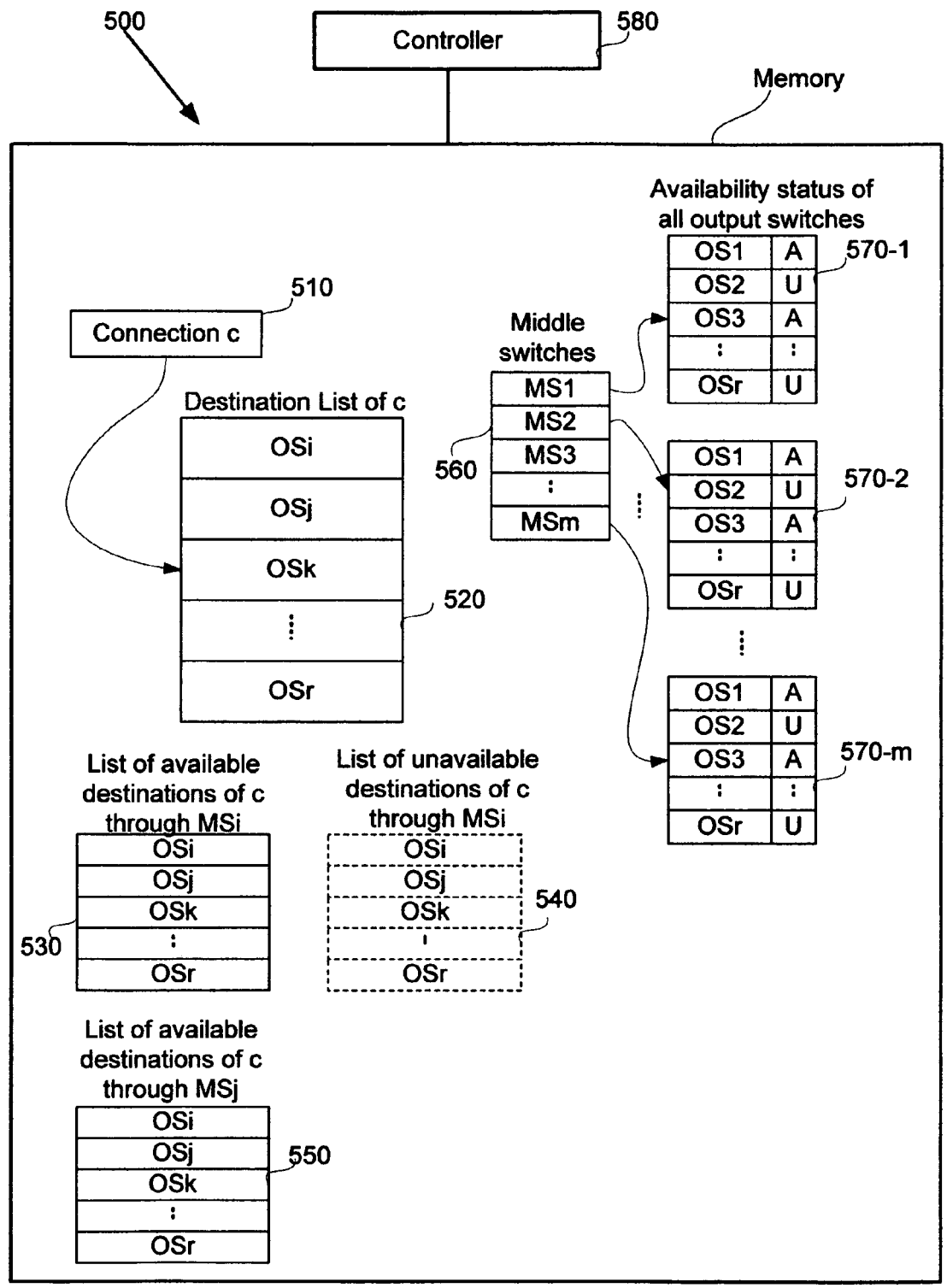
FIG. 4D implements, in one embodiment, the data structures used to store and retrieve data from memory of a controller that implements the method of FIG. 4C.

FIG. 4D illustrates, in one embodiment, the data structures used to store and retrieve data from memory of a controller that implements the method of FIG. 4C. In this embodiment, the fan-out of at most two in the input switch of each connection is implemented by use of two data structures (such as arrays or linked lists) to indicate the destinations that can be reached from each of two middle switches. Specifically as illustrated in FIG. 4D, two arrays 530 and 550 are determined for each of the two middle switches MSi and MSj that are checked for possible use in setting up the connection, for example in act 148 of the rearrangeable scheduling method 140 of FIG. 1B. Arrays 530 and 550 are determined as follows. Each connection request 510 is specified by an array 520 of destination switch identifiers (and also an inlet link of an input switch identifier). Another array 560 of middle switches contains m elements one each for all the middle switches of the network. Each element of array 560 has a pointer to one of m arrays, 570-1 to 570-$m$, containing a bit that indicates availability status (hereinafter availability status bit) for each output switch OS1-OSr as shown in FIG. 4D. If second internal link to an output switch is available from a middle switch, the corresponding bit in the availability status array is set to 'A' (to denote available, i.e. unused link) as shown in FIG. 4D. Otherwise the corresponding bit is set to 'U' (to denote unavailable, i.e. unused link).

For each connection 510 each pair of middle switches MSi, and MSj are checked to see if all the destinations of connection 510 are reachable from the pair. Specifically this condition is checked by using the availability status arrays 570-$i$, 570-$j$ of two middle switches MSi and MSj, to determine the available destinations of the connection 510 from MSi and MSj in the respective arrays 530 and 550. In one implementation, each destination is checked if it is available from any one of the middle switches MSi and MSj, and if both the middle switches MSi and MSj do not have availability for a particular destination, this particular pair of middle switches MSi and MSj cannot be used to set up the connection. However if middle switches MSi and MSj are determined to have unavailability of a particular destination, a different pair of middle switches are checked for example the middle switches MSi and MSk. In this implementation, middle switches MSi and MSk are checked for the availability of all the destinations of the connection 510 in the same manner as middle switches MSi and MSj. Therefore in this implementation, there is no need to use an additional array 540 of unavailable destinations from middle switch MSi (as discussed next).

An alternative implementation saves (see act 305 of FIG. 4C) an array 540 (see FIG. 4D) of unavailable destinations from middle switch MSi, at the time middle switch MSi is first paired with a middle switch, (e.g. MSj) other than itself when attempting to satisfy the connection request 510. Such saving of array 540 eliminates the need for each destination of the connection request 510 to be checked for middle switch MSi, when middle switch MSi is paired with another middle switch (e.g. MSk). If the array 540 of unavailable destinations from MSi is saved once, only these destinations (in array 540) need to be checked for availability in middle switch MSk, which improves the speed of the computation. The embodiment of FIG. 4D can be implemented to set up connections in a controller 580 and memory 500 (described above in reference to FIG. 1A, FIG. 2A, and FIG. 2B etc.).

Figure 5A:
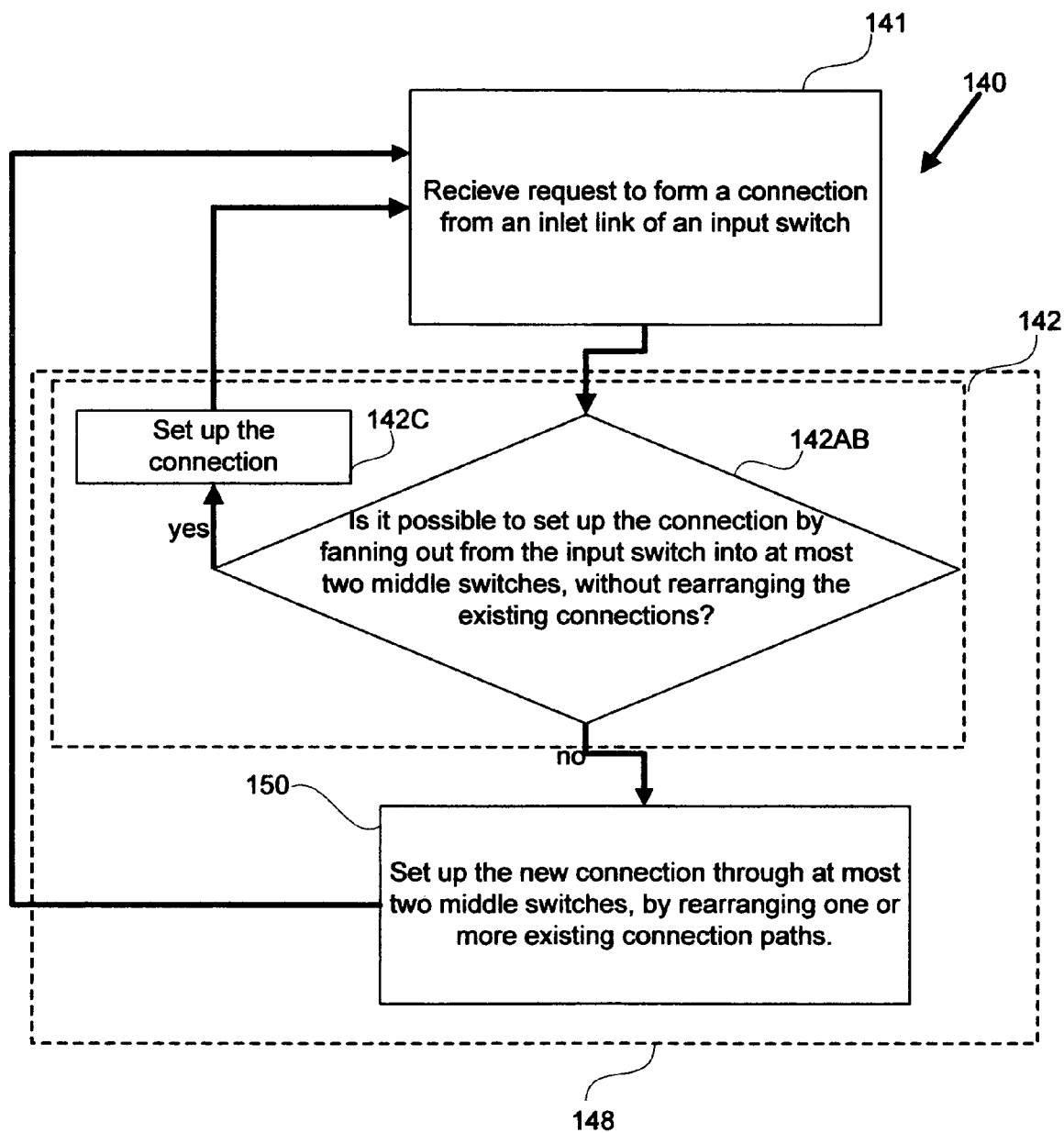
FIG. 5A is intermediate level flowchart of one implementation of the method 140 of FIG. 1B.

FIG. 5A is intermediate level flowchart of one implementation of the method 140 of FIG. 1B. According to this implementation, a multicast connection request is received in act 141. In act 142AB, the method 140 checks if the connection can be set up by fanning out into at most two middle stage switches from its input switch. If 142AB results in "yes", the control goes to act 142C and the connection is set up. Then control returns to act 141. If act 142AB results in "no", the control goes to act 150 (also called "method 150") and the connection is set up by an act of changing the paths (also called a "rearranging act") of one or more existing connections. Then the control is returned to act 141. And thus acts 141, 142 and 150 are executed in a loop for each multicast connection request. Acts 142 and 150 together form act 148.

Although, in FIG. 5A certain acts 142AB and 142C are described, as would be apparent to the skilled person other acts can be performed in act 142 (to check the possibility of setting up a connection) in combination with act 150. According to one embodiment no more than 2*n middle stage switches are used by the method 140 (FIG. 5A) in the network of FIG. 1A, where the number of inlet links IL1-IL2 equals the number of outlet links OL1-OL2, both represented by the variable n, to be a rearrangeably nonblocking symmetrical switching network. If the network is asymmetric no more than $n_1+n_2$ middle switches are used by the method 140, wherein $n_1$ is the number of inlet links in each input switch and $n_2$ is the number of outlet links in each output switch.

Figure 5B:
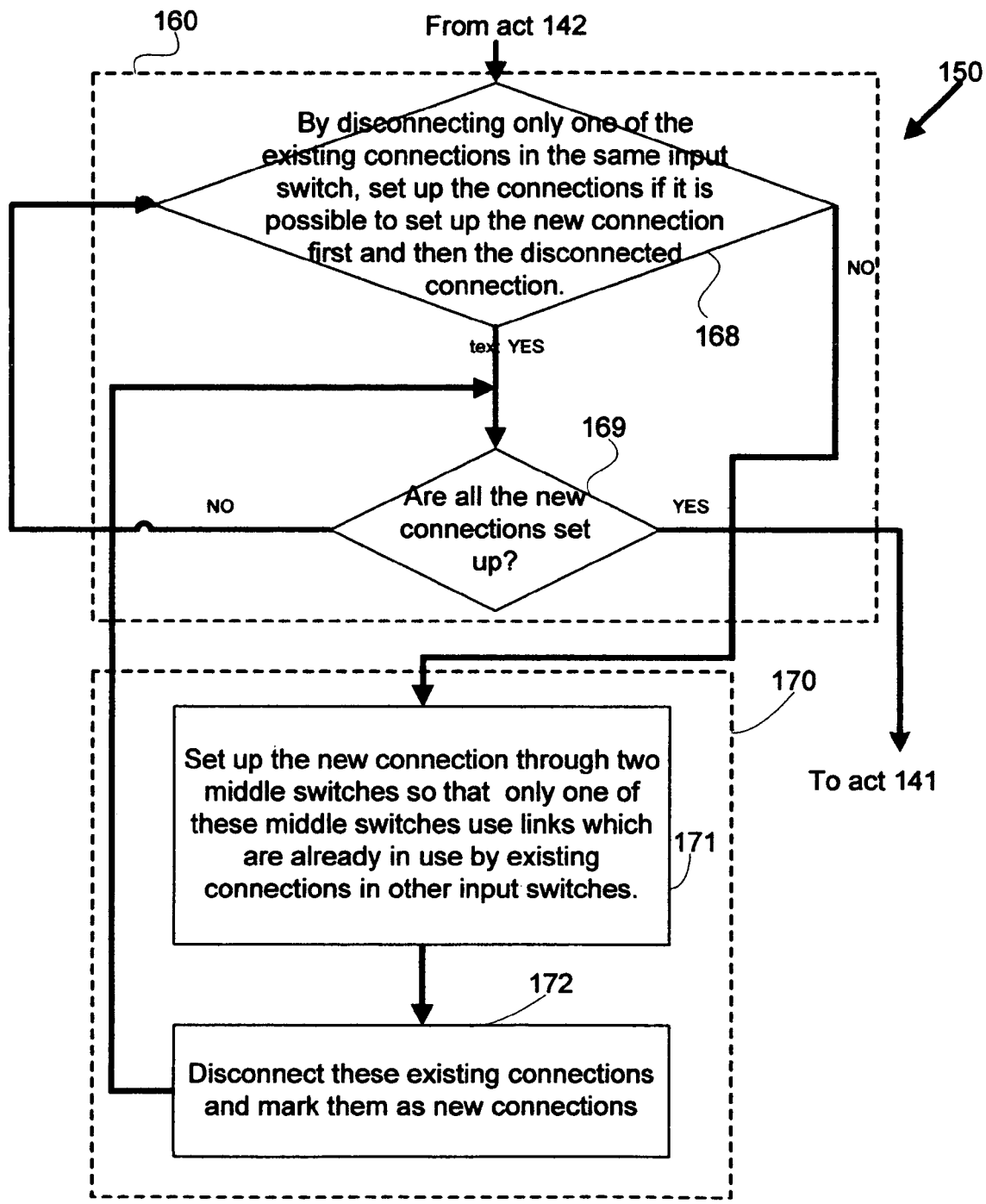
FIG. 5B is first intermediate level flowchart of one embodiment of the rearrangement act 150 of the method of FIG. 5A.

FIG. 5B is an intermediate level ("also called first intermediate level") flowchart of one embodiment of the rearrangement act 150 of FIG. 5A. The control comes to act 150 when the multicast connection through at most two middle switches cannot be set up without rearranging one or more existing connections. In act 168, each existing connection in the input switch (of the new connection) is disconnected temporarily, to be reconnected later. Thereafter the new connection and the disconnected connection, in that order, are tried to be set up. This is repeated for each existing connection in the input switch of the new connection until both get set up.

Although in this description the term "disconnection" is used, it is to be understood that an existing connection need not be actually disconnected during the performance of act 150 of the method 140 of FIG. 5A. And instead such an existing connection can be marked for disconnection in acts 168A and/or 172A while performing the method in an alternative embodiment, and the actual disconnection is performed at the end if it is determined that the method 140 is successful in setting up the new connection by use of links freed by such disconnection.

If both get set up act 168 results in "yes". If act 168 results in "no" for all the existing connections, the control goes to act 171. In act 171, the new connection is set up through two middle switches having available first internal links so that only one of these two middle switches use second internal links which are already in use by one or more existing multicast connections from other input switches (hereinafter called "incompatible existing connections"). And the control goes to act 172. In act 172, the incompatible existing connections are disconnected and marked as visited. Then the control is transferred to act 169. In act 169, the method 150 checks if there are more new connections to be set up. If there are no new connections to be set up control goes to act 141, to receive the next multicast connection request However in act 169, if there are more new connections to be set up, the control goes to act 168 and acts of 168, 169, 171, and 172 are recursively performed until the method exits to act 141. When the control goes to act 141, it means the new connection and all the incompatible connections are set up through at most two middle switches.

The rearrangement method 150 of FIG. 5B can also be observed as a loop consisting of acts 168, 168 and 170. In act 168, each new connection is tried to be set up by rearranging existing connections in its own input switch. If act 168 results in "no", in act 170 the new connection is set up by forcibly disconnecting one or more existing connections in other input switches. And then the disconnected connections are marked as new connections and the process is repeated in a loop until the new connection and all the disconnected connections are set up.

Figure 5C:
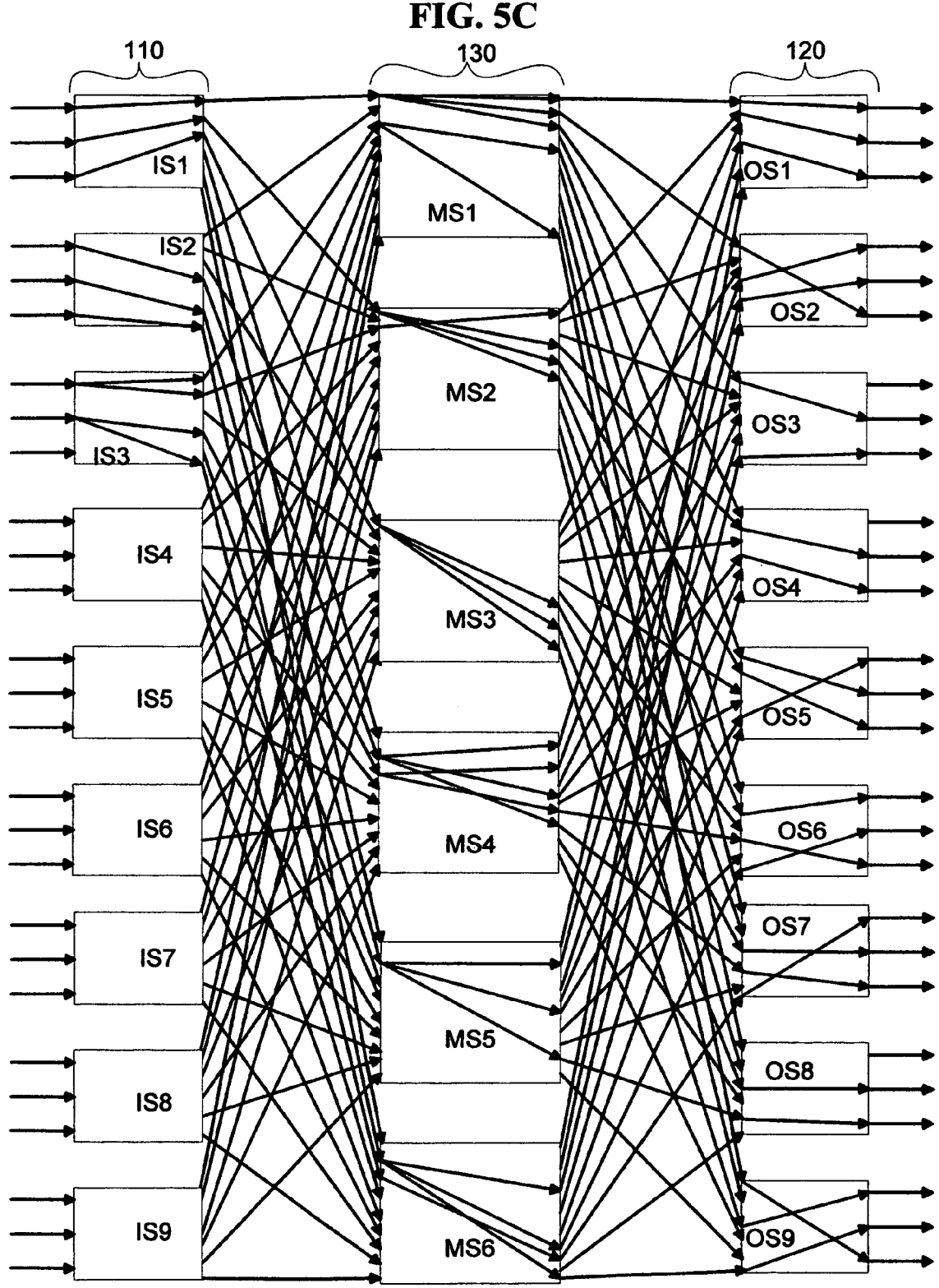
FIG. 5C shows an exemplary V(6,3,9) network with certain existing multicast connections.

FIG. 5C shows the state of the network of FIG. 3D after the connection $I_8$ of Table 1 is set up using the scheduling method 140 of FIG. 5A. Act 142AB of the scheduling method 140 of FIG. 5A could not find a single middle switch to set up the connection. However act 142AB finds two middle switches MS4 and MS6 to be available for the connection and accordingly the connection $I_8$ is set up in act 142C. And so $I_8$ fans out twice in the first switch IS3 into the middle switches MS4 and MS6. Also in the middle switch MS4 it fans out twice into output switches OS2 and OS6, and in the middle switch MS6 it fans out once into output switch OS7 to be connected to all the destinations.

Figure 5D:
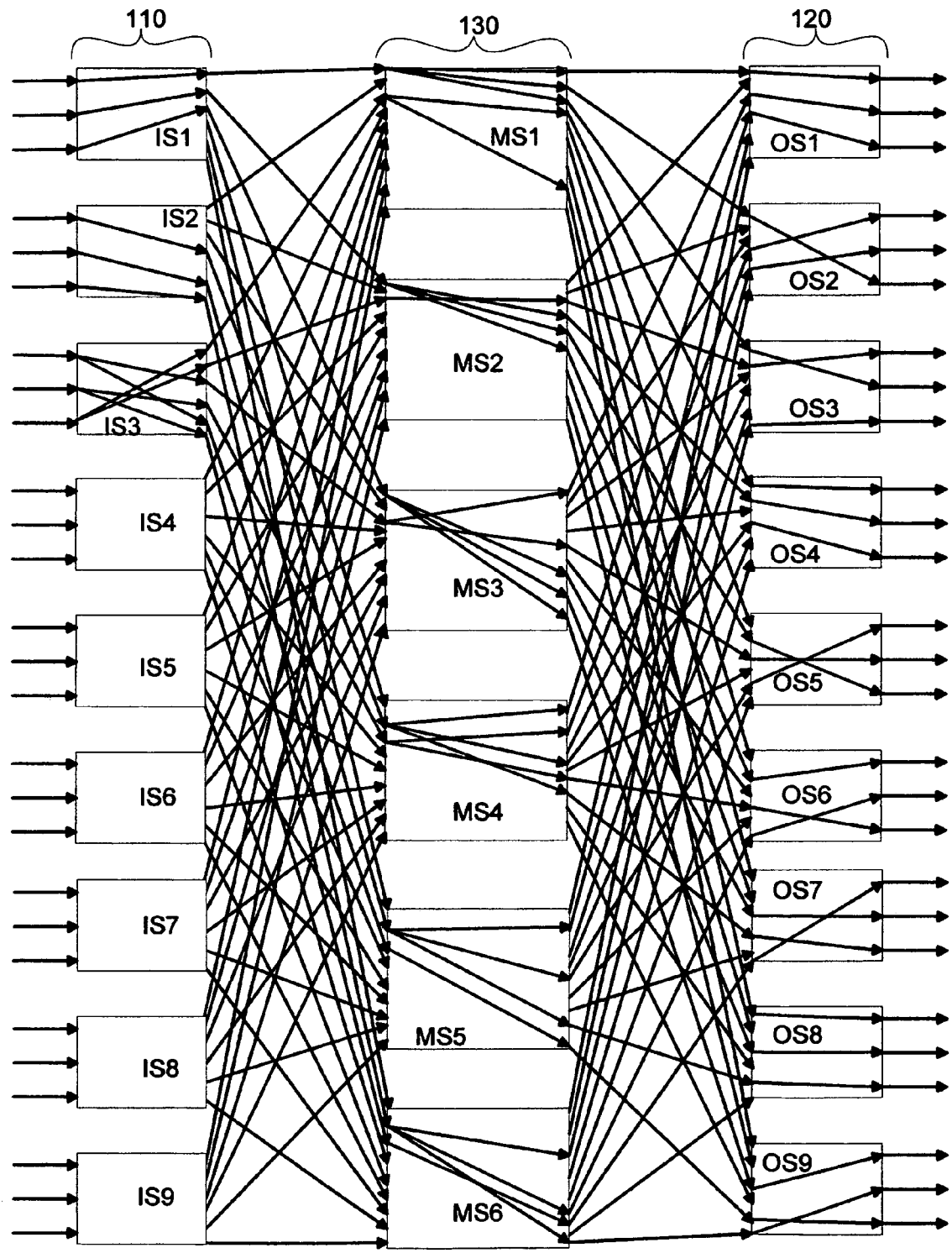
FIG. 5D shows the network of FIG. 5C after a new multicast connection is set up by rearranging an existing connection in the network, using the method 140 of FIG. 5A.

FIG. 5D shows the state of the network of FIG. 5C after the connection $I_9$ of Table 1 is set up using the rearrangeable scheduling method 140 of FIG. 5A. In act 142AB, the scheduling method of FIG. 5A could not find a single middle switch to set up the connection. Act 142AB also could not find two middle switches to set up the connection because from input switch IS3 there are only two middle switches MS3 and MS5 with available links. And the connection $I_9$ has destinations of OS3, OS4, and OS8. And from both the middles switches MS3 and MS5 the link to output switch OS8 is not available when performing acts of 142AB. And hence act 142 results in "no" and the control goes to rearrangement act 150.

In act 150 the control goes to act 168 of FIG. 5B. In act 168, each connection from the same input switch IS3 of the connection $I_9$ is disconnected. First it disconnects the connection $I_7$ and so the first internal links from input switch IS3 to middle switches MS1 and MS2 are now available and the second internal links from middle switch MS1 to output switches OS5 and OS9 are now available and also the second internal link from middle switch MS2 to output switch OS1 is also available. Then act 168 tries to set up the connection $I_9$ by using no more than two middle switches and it will be set up through middle switches MS1 and MS2. And so, in this example, $I_9$ fans out twice in the input switch IS3 into the middles switches MS1 and MS2. Also in the middle switch MS1 it fans out twice into output switches OS4 and OS8, and in the middle switch MS2 it fans out once into output switch OS3 to be connected to all the destinations.

Later act 168 tries to set up the disconnected connection $I_7$ by using no more than two middle switches and it will be set up through the middle switches MS3 and MS5. And, in this example, $I_7$ fans out twice in the input switch IS3 into the middles switches MS3 and MS5. Also in the middle switch MS3 it fans out twice into output switches OS1 and OS5, and in the middle switch MS5 it fans out once into output switch OS5 to be connected to all the destinations. And thus act 168 rearranges the existing connection $I_7$ changing its path from the middle switches MS1 and MS2 to the middle switches MS3 and MS5 to set up the new connection $I_9$ through the middle switches MS1 and MS2. From act 168 the control goes to act 169. In act 169 the method 150 checks if all the new connections are set up, and since they are all set up the control goes to act 141 where it is ready to receive the next multicast connection request.

Figure 5E:
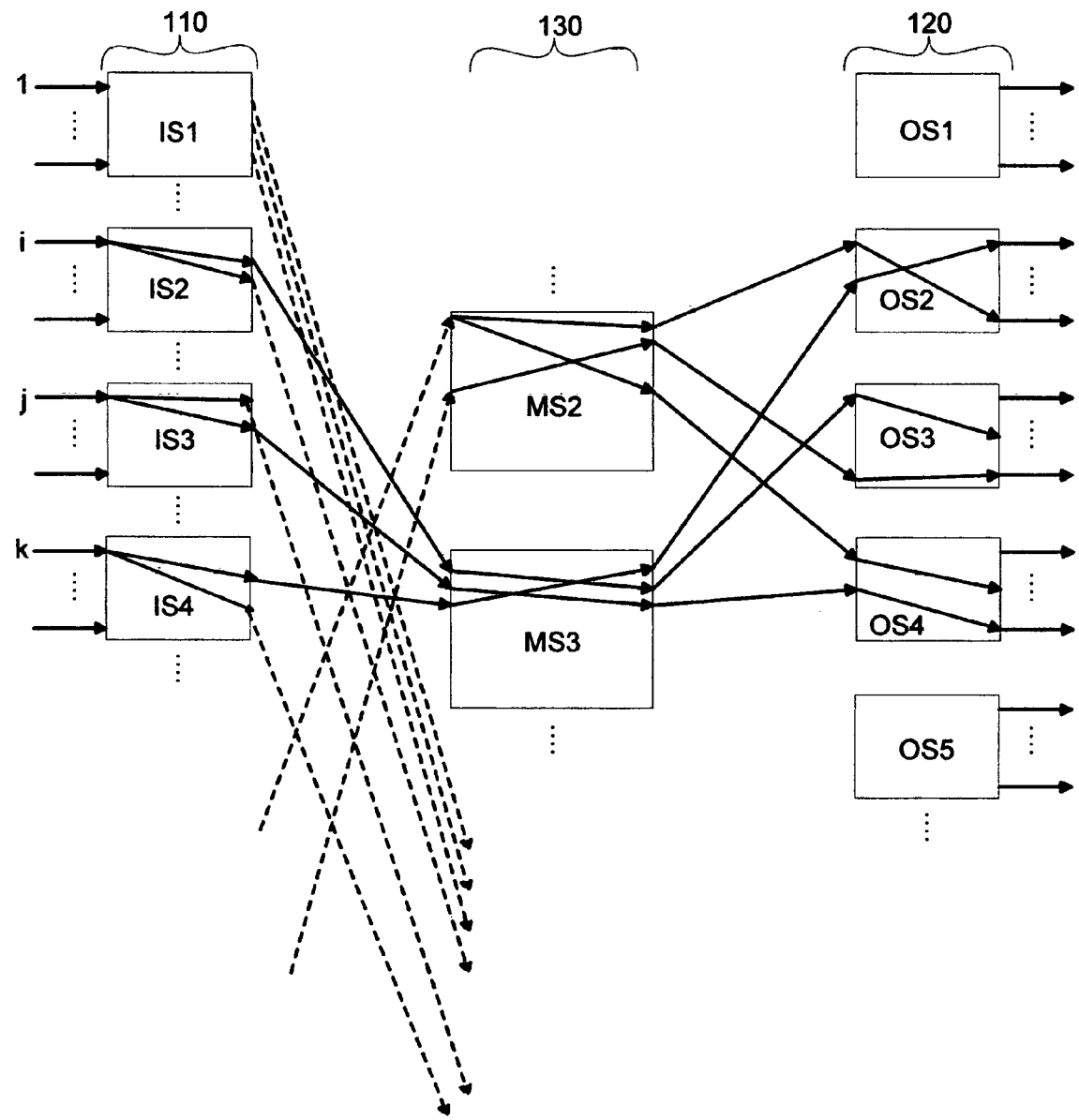
FIG. 5E shows an example of existing multicast connections in a network where in a new multicast connection is to be set up.

FIG. 5E shows a partial diagram of an exemplary three-stage network. There are many existing connections (not shown in the diagram). But three existing connections $I_i$, $I_j$, and $I_k$ are fanning out twice in their input switches. Each of these three connections fan out into middle switch MS3. In middle switch MS3, the connections $I_i$, $I_j$, and $I_k$ each fan out once into output switches OS3, OS4, and OS2 respectively. And in the output switches OS3, OS4, and OS2 the existing connections $I_i$, $I_j$, and $I_k$ fan out once. Suppose a new connection $I_l$ with destinations to the output switches OS1, OS2, OS3, OS4, and OS5 is to be set up in this network using the method 140 of FIG. 5A. Also in this example, the connection $I_1$ cannot be set up in act 142AB. And so the control goes to act 150. In the implementation of act 150 in FIG. 5B, act 168 cannot setup the connection by disconnecting only one of the existing connections in its input switch IS1. And the control goes to act 171. In act 171, it selects the two middle switches MS2 and MS3 to set up the connection. That is the new connection $I_1$ is tried to be fanned out into middle switches MS2 and MS3. In middle switch MS2 there are available links to only two destination switches OS1 and OS5 out of the required five destinations. In middle switch MS3 all the three remaining destinations OS2, OS3, and OS4 are unavailable because the existing connections $I_i$, $I_j$, and $I_k$ from other input switches are currently using the second internal links to all the three output switches OS2, OS3, and OS4. And so the three connections $I_i$, $I_j$, and $I_k$ are the incompatible existing connections. In act 172 these three connections are disconnected and the new connection $I_1$ is set up through the middle switches MS2 and MS3.

Figure 5F:
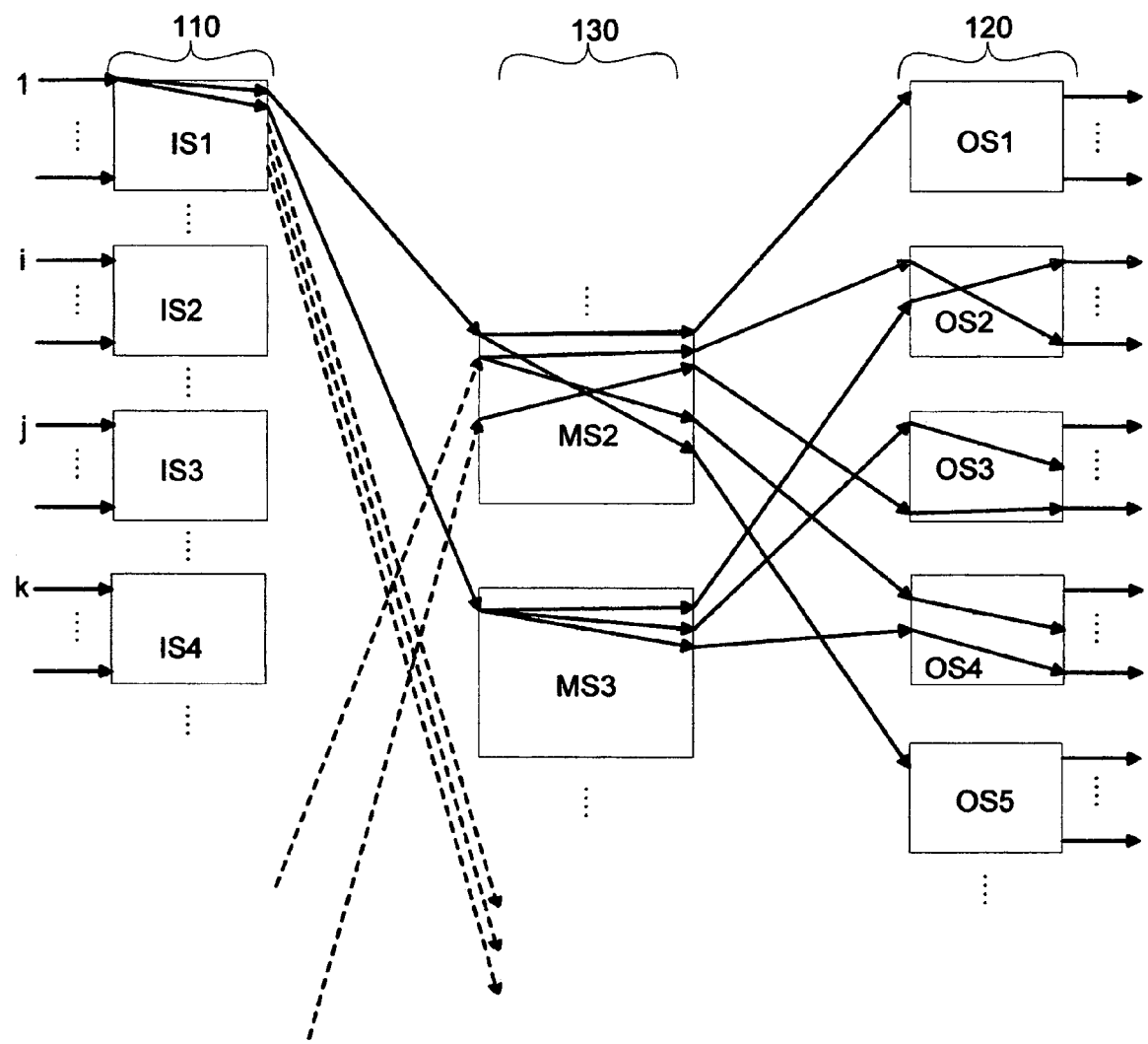
FIG. 5F is the network of FIG. 5E after the new connection has been set up and some existing connections have been disconnected which will be set up later.

FIG. 5F shows the network of FIG. 5E after the incompatible existing connections $I_i$, $I_j$, and $I_k$ are disconnected and the new connection $I_1$ is set up through the middle switches MS2 and MS3. In the middle switch MS2, connection $I_1$ fans out twice into the output switches OS1 and OS5. In the middle switch MS3 it fans out thrice into the output switches OS2, OS3, and OS4. In act 172, the incompatible existing connections $I_i$, $I_j$, and $I_k$ are marked as new connections to be formed, after being disconnected. And the control goes to act 169, where it results in "no" because there are new connections to be set up. So from act 169, control transfers to act 168. In act 168 the connections $I_i$, $I_j$, and $I_k$ will be tried to be set up. In one implementation, new connections $I_i$, $I_j$, and $I_k$ are set up by disconnecting only one connection in their respective input switches, and if necessary other existing connections may be disconnected.

In rearrangeably nonblocking networks, the switch hardware cost is reduced at the expense of increasing the time required to set up connection a connection. The set up time is increased in a rearrangeably nonblocking network because existing connections that are disrupted to implement rearrangement need to be themselves set up, in addition to the new connection. For this reason, it is desirable to minimize or even eliminate the need for rearrangements to existing connections when setting up a new connection. When the need for rearrangement is eliminated, that network is either wide-sense nonblocking or strictly nonblocking, depending on the number of middle switches and the scheduling method.

In strictly nonblocking multicast networks, for any request to form a multicast connection from an inlet link to some set of outlet links, it is always possible to find a path through the network to satisfy the request without disturbing any existing multicast connections, and if more than one such path is available, any of them can be selected without being concerned about realization of future potential multicast connection requests. In wide-sense nonblocking multicast networks, it is again always possible to provide a connection path through the network to satisfy the request without disturbing other existing multicast connections, but in this case the path used to satisfy the connection request must be selected to maintain nonblocking connecting capability for future multicast connection requests. In strictly nonblocking networks and in wide-sense nonblocking networks, the switch hardware cost is increased but the time required to set up connections is reduced compared to rearrangeably nonblocking networks. Embodiments of strictly nonblocking networks using $3*n-1$ or more middle switches are described in the related U.S. patent application Ser. No. 09/967,106 that is incorporated by reference above. The foregoing discussion relates to embodiments of rearrangeably nonblocking networks where the switch hardware cost is smaller.

Figure 6A:
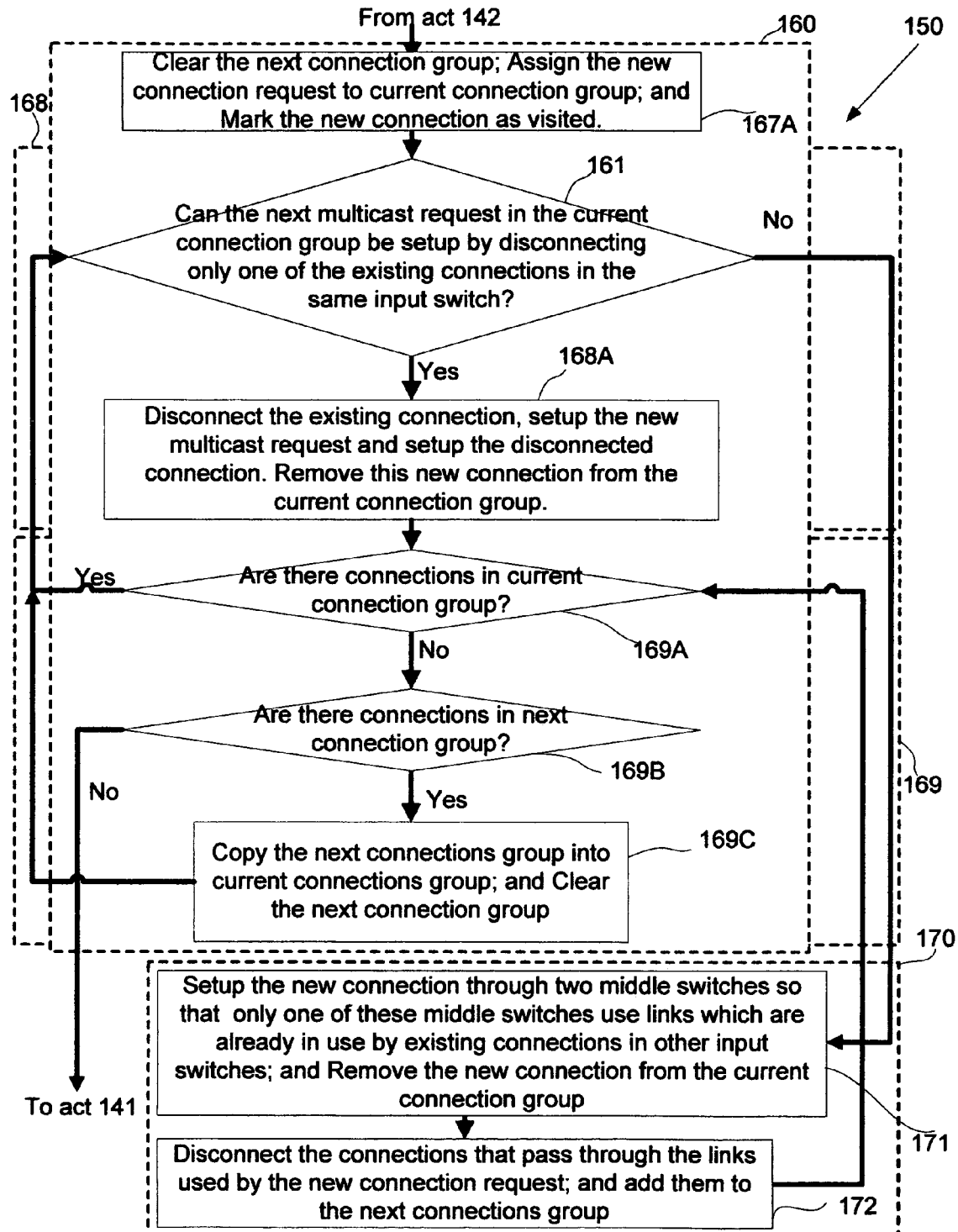
FIG. 6A is second intermediate level flowchart of one implementation of the method 150 of FIG. 5B.

FIG. 6A is a detailed intermediate level (also called "second intermediate level") flowchart of one implementation of the method of FIG. 5B. The control comes to act 160, from act 142, when the connection through at most two middle switches cannot be set up without rearranging one or more existing connections. In act 167A, the method 150 assigns the new connection to a group of connections called the current connection group. Another group of connections called next connection group is initialized to contain no connections. Both current connection group and next connection group contain a list of connections to be set up. Initially, i.e. when the control comes from act 142 to act 167A, the current connection group contains the new connection and the next connection group contains no connections. Also mark the new connection as visited. From act 167A, the control goes to act 161 where the method 150 checks if the a next connection request in the current connection group, which is initially the new connection, can be set up by disconnecting only one of the existing connections in the same input switch of the new connection. And then act 161 checks if the disconnected connection can also be set up. If both the new connection and the disconnected connections can be set up, the control goes to act 168A. In act 168A, the existing connection chosen in act 161 is disconnected, and the new multicast request and disconnected connection, in that order, are set up. The new connection is removed from the current connection group. The control is then transferred to act 169A. In act 161, for all the existing connections in the same input switch of the new connection, after disconnecting each of them if it is checked that either the new connection cannot set up or the disconnected connection cannot be set up, act 161 results in "no". In such case, act 161 makes sure the disconnected connection is set up again and the new connection is still not set up. Then the control goes to act 171.

In act 171, the new connection is set up through two middle switches having available first internal links so that only one of these two middle switches use second internal links which are already in use by one or more existing multicast connections from other input switches (hereinafter called "incompatible existing connections"). Also the new connection is removed from the current connection group. And the control goes to act 172. In act 172, the incompatible existing connections are disconnected, marked as visited, and added to the next connection group as new connection requests that need to be set up. Then the control is transferred to act 169A. In act 169A, the method 150 checks if there are more connections in the current connection group. If not control goes to act 169B. In 169B, the method 150 checks if there are more connections in the next connection group. If not the control goes to act 141 and the rearrangeable scheduling method 150 will be completed, which means the new connection is set up by rearranging the existing connections and using a fan-out of no more than two in the input switch. If act 169B results in "yes", control goes to act 169C where the next connection group is copied into the current connection group and the next connection group is cleared. And the control transfers to act 161. Also when act 169A results in "yes", the control is transferred to act 161. And act 161 repeats the process to the next new connection request in the current connection group until the method 150 reaches act 141 which means the new connection is set up by rearranging some existing connections.

Figure 6B:
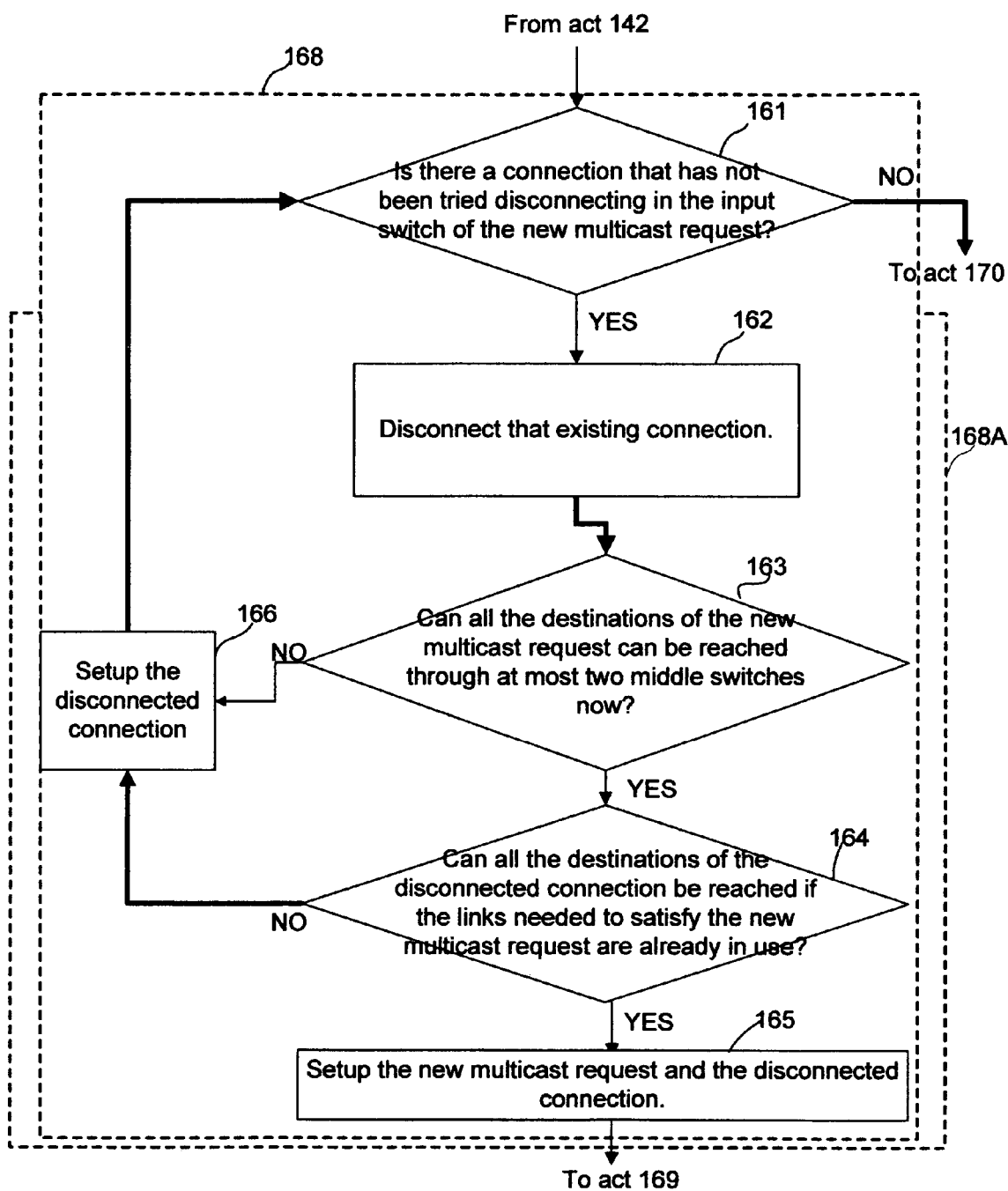
FIG. 6B is low-level flowchart of one variant of act 168 of the method of FIG. 6A.

FIG. 6B is low-level flowchart of one variant of act 168 of the method of FIG. 6A. The control comes to act 168, from act 142, when the multicast connection cannot be set up through at most two middle switches without rearranging one or more existing connections. In act 161, if there is an existing connection that has not been tried to be disconnected in the input switch of the multicast request, the control goes to act 162. In act 162, the particular existing connection is disconnected. The control transfers to act 163. In act 163, the method 160 checks if all the destinations of the new multicast request can be reached through at most two middle switches now. If so the control transfers to act 164.

In act 164, the method 160 checks if all the destinations of the disconnected connection could be reached if the links needed to satisfy the new multicast connection request are already in use. If so, the control goes to act 165 where both the new multicast request and the disconnected connection are set up in that order. From act 165 control transfers to act 169. If any of acts 163 or 164 result in "no" control transfers to act 166 where the disconnected connection is set up. From act 166, the control transfers to act 161 where the process is repeated for the next untried existing connection. In act 161, if there are no more untried existing connections the control transfers to act 170. If the control goes to act 170, it means the new connection request cannot be satisfied by disconnecting only one existing connection in the same input switch.

Figure 6C:
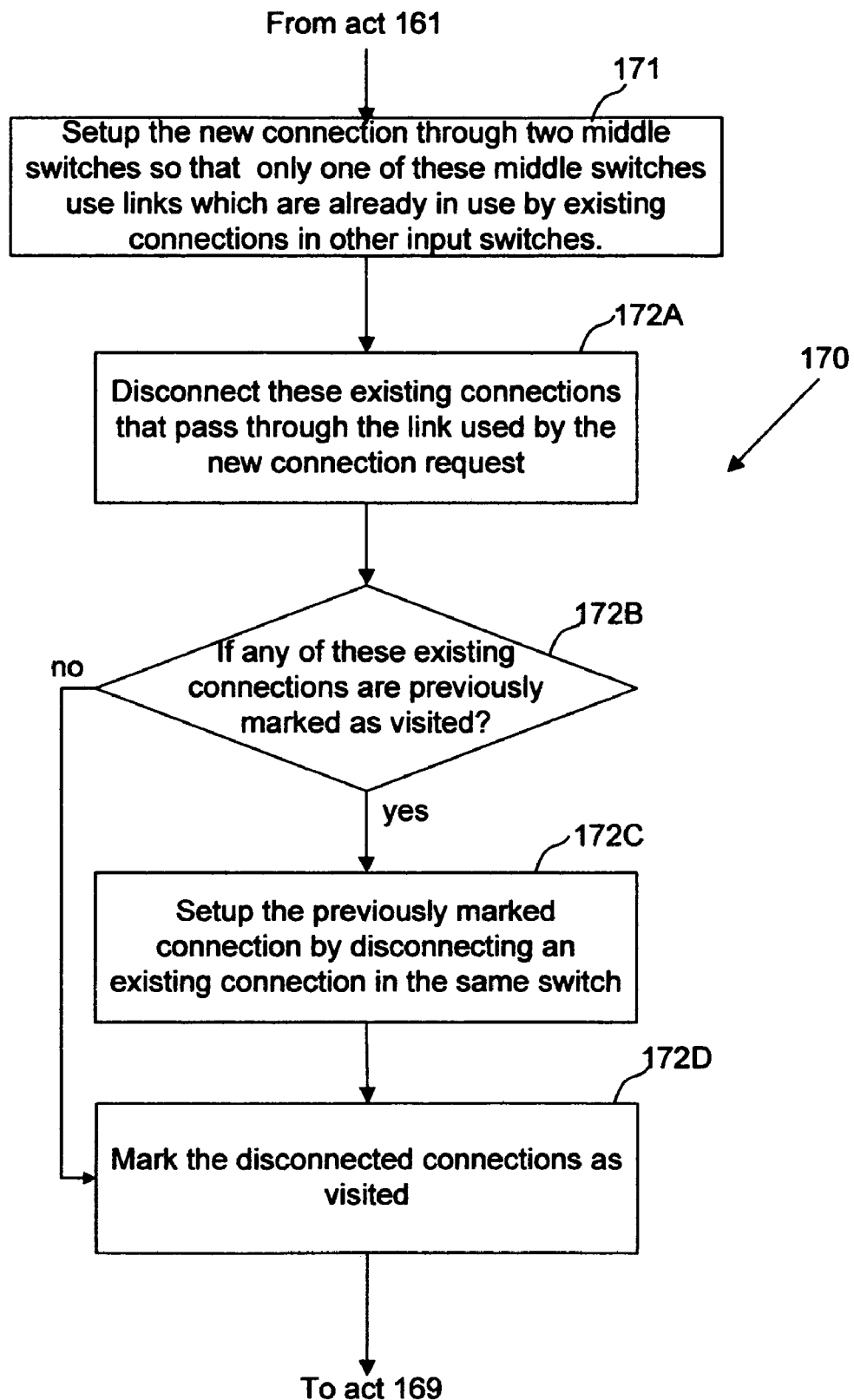
FIG. 6C is low-level flowchart of one variant of act 170 of the method of FIG. 6A.

FIG. 6C is low-level flowchart of one variant of act 170 of the method of FIG. 6A. The control comes to act 170, from act 161, because the next connection request cannot be set up by disconnecting only one of the existing connections in the same input switch. In act 171, the new connection is set up through two middle switches having available first internal links so that only one of these two middle switches use second internal links which are already in use by one or more existing multicast connections from other input switches (hereinafter called "incompatible existing connections"). And the control goes to act 172A. In act 172A, the incompatible existing connections are disconnected. At this point the new connection has now been set up, and only the remaining task is to set up any previously existing connections that are being disconnected (to accommodate the new connection). The control then goes to act 172B. In act 172B, the method 170 checks if any of the existing connections was marked as visited (generated by existing connections being disconnected in an attempt to rearrange). If so for all these connections the control transfers to act 172C. In act 172C, a different existing connection from the same input switch which itself was not marked as visited, is chosen to be disconnected so that the existing connection which is marked visited can be set up through two middle switches. The control then transfers to act 172D. In act 172B, for all the existing connections, which were not marked visited, the control transfers to act 172D. In act 172D, all the disconnected connections are marked as visited. From act 172D, the control goes to act 169.

When the scheduling method of FIG. 4B returns fail, the following rearrangement method is called to set up the new connection request by rearranging one or more previously set up requests. The method illustrates the pseudo code of the rearrangement method 150 to set up a new multicast connection request through the network of FIG. 2B.

Pseudo Code for the Rearrangement Method:

```
Step 1:   L_next = new connection to be rearranged;
          Mark the new connection as visited ;
Step 2:   L_current = L_next ;
Step 3:   while(L_current != φ) {
Step 4:       for i = each connection in the list L_current {
Step 5:           for j = each connection in the same input switch as i {
Step 6:               Disconnect(j) ;
Step 7:               if(Schedule(i) == FAIL) {
                          Schedule(j) ;
                          Continue;
Step 8:               } else if(Schedule(j) == FAIL) {
                          Disconnect(i) ;
                          Schedule(j) ;
                          Continue ;
Step 9:               } else {
                          Remove connection i from the list L_next ;
                          Break ;
                      }
                  }
              }
Step 10:  Clear the list L_current ;
Step 11:  for k = each connection in the list L_next {
Step 12:      Set up k on any two available middle switches such that incompatibilities
              arise in the only one of the two middle switches ;
Step 13:      Disconnect all the incompatible connections in the other switches;
Step 14:      For each incompatible connection {
Step 15:          If (the connection visited before) {
Step 16:              Select and disconnect another existing connection from the same input
```

-continued

```
                switch that was not visited such that the incompatible connection is set up;
            }
        }
Step 17:    Mark all the disconnected connections as visited ;
            Add them in the list L_current ;
        }
Step 18:    Clear the list L_next ;
Step 19:    L_next = L_current ;
    }
```

Step 1 and Step 2 start with assigning the current multicast requests to be rearranged to the lists L_next and L_current respectively. When the method is called first, L_next and L_current will contain only the new request. Step 1 also marks the current multicast request as visited. Step 3 starts the while loop. If L_current contains no requests the method stops executing which means the new request is set up in the multi-stage network. Initially Step 3 results in "TRUE" and the control goes to Step 4.

Step 4 starts a for loop, with loop index as i, to step through all the requests in L_current. The first time this loop is executed, L_current will contain only the new request. Step 5 is a loop, with loop index as j, for stepping through all the previously set up connections in the same input switch as the request i. Step 6 disconnects the existing connection j. Step 7 tries to set up connection i and if connection i still cannot be set up, existing connection j is set up and the loop continues to set the next existing connection as j. Step 8 tries to set up the existing connection j, in case the connection i is set up in Step 7. If existing connection j cannot be set up (after the connection i is set up in Step 7), the connection i is disconnected and the existing connection j is set up and the loop continues to set the next existing connection as j. Step 9 removes the request the connection i from L_next, when both the connection i and the existing connection j are set up in Step 7 and Step 8 respectively.

Step 10 clears L_current list. If at least one of the connections cannot be set up by rearranging only one existing connection in the same input switch, L_next will not be empty when Step 11 is executed. Step 11 starts the loop for setting up the requests in L_next list. Each connection k is set up through two middle switches having available first internal links so that only one of these two middle switches use second internal links which are already in use by one or more existing multicast connections from other input switches (hereinafter called "incompatible existing connections"). In Step 13, the incompatible existing connections are disconnected. In Step 14, each incompatible connection is checked if it is visited before, in a loop. In Step 15, it is checked if an incompatible connection is visited before. If so, in Step 16, another existing connection is disconnected which itself was not visited before such that the incompatible connection marked as visited is set up. Then in Step 17, all the disconnected connections are marked as visited and they all are added to the list L_current. Step 18 clears the L_next and Step 19 copies L_current into L_next. The while loop of step 3 is continued until L_current is empty. The foregoing rearrangement method has the time complexity of O(r*n). The method converges and finds a nonblocking schedule for any multicast assignment based on the proof of this invention discussed later.

Figure 7A:
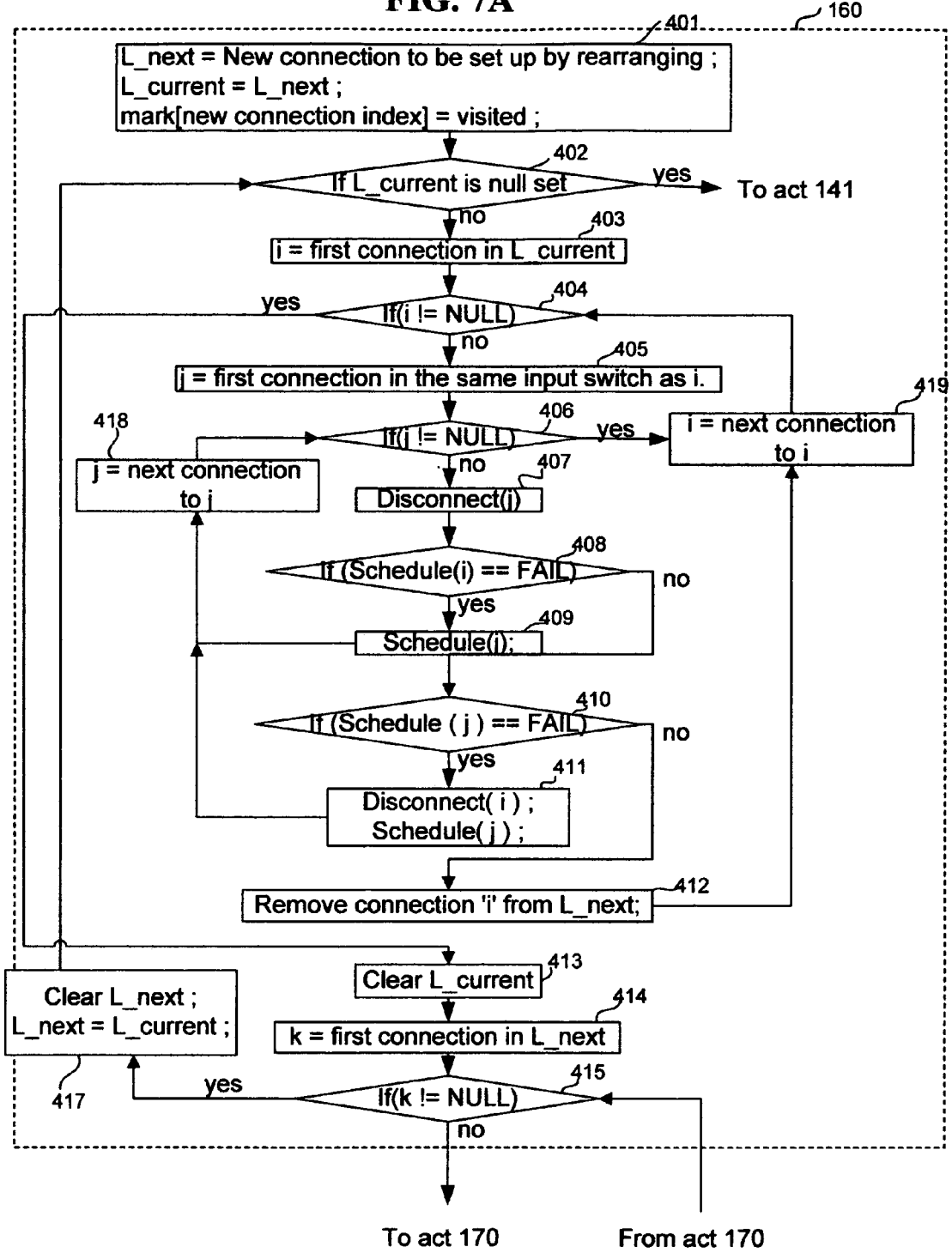
FIG. 7A illustrates, in a flowchart, pseudo code for one example of act 160 of the rearrangement method 150 of FIG. 6A.
Figure 7B:
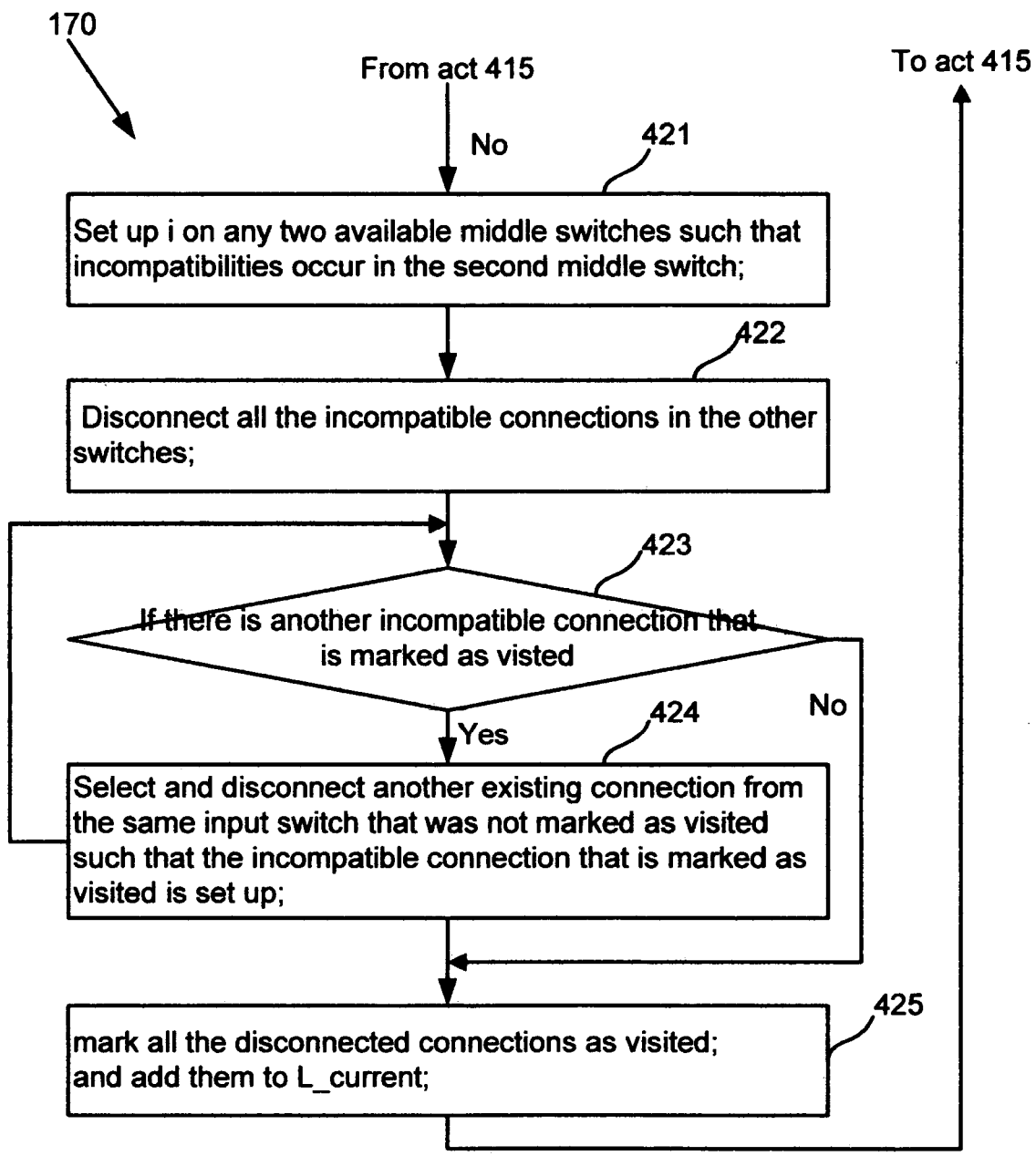
FIG. 7B illustrates, in a flowchart, pseudo code for one example of act 170 of the rearrangement method 150 of FIG. 6A.

FIG. 7A illustrates, in a flowchart, pseudo code for one example of act 160 of rearrangement method of FIG. 6A. FIG. 7B illustrates, in a flowchart, pseudo code for one example of act 170 of rearrangement method of FIG. 6A. The flowcharts of FIG. 7A and FIG. 7B are similar to the pseudo code of the rearrangement method above excepting for one difference. The flowchart expands the loop control code for all the for loops into loop initialization code, loop exit code and loop step through code. Table 3 shows how the steps 1-15 of the above pseudo code implement the flowcharts of the methods illustrated in FIG. 7A and FIG. 7B, in one particular implementation.

TABLE 3

| Steps of the psuedo code of the rearrangement method | Acts of Flowchart of FIG. 7A and FIG. 7B |
| --- | --- |
| 1, 2 | 401 |
| 3 | 402 |
| 4 | 403, 404, 419 |
| 5 | 405, 406, 418 |
| 6 | 407 |
| 7 | 408, 409 |
| 8 | 410, 411 |
| 9 | 412 |
| 10 | 413 |
| 11 | 414, 415 |
| 12 | 421 |
| 13 | 422 |
| 14, 15 | 423 |
| 16 | 424 |
| 17 | 425 |
| 18, 19 | 417 |

In another embodiment, in either of or both of act 168 and act 171 of FIG. 5B, instead of only one existing connection, two or more existing connections can also be attempted disconnecting and so that the new connection and the disconnected existing connections can all be set up in any one of all the possible the combinations of order of set up. For example in any of act 168 or act 171, two existing connections A and B in the same input switch can be disconnected and can be tried setting up in the following two ways: 1) the new connection, existing connection A, and existing connection B are tried setting up in that order or 2) the new connection, existing connection B, and existing connection A are tried setting up in that order. In any of these setting up acts, if the new connection and both the connections A and B are all set up, the rearrangement method 150 will be successful and the arrangement act 150 goes to act 141 to receive the next connection request. Similarly three existing connections in the same input switch can be tried disconnecting and setting up in all the six combinations after the new connection is set up. In the same way more than three existing connections can be tried with. Also all these varieties of disconnecting one, two or more can be tried individually in each rearrangement act of 150 or can be tried by using in any arbitrary mixed ways in setting up any new connection.

First the proof for the rearrangeably nonblocking behavior of symmetric networks V(m,n,r) of the invention is presented. Later it will be extended for asymmetric networks V(m,$n_1$,$r_1$, $n_2$,$r_2$). According to the current invention when m>=2*n, the V(m,n,r) Clos network is operated in rearrangeably nonblocking manner for multicast connections if the following scheduling criterion is met: Every connection request is fanned out at most twice in the input switch; Alternatively every connection request is set up through at most two middle switches.

Since when m>=2*n−1, the V(m,n,r) network is strictly nonblocking for unicast assignments, it means for unicast assignments, applicant notes that there always exists an available link through at least one middle switch from any arbitrary input switch to any arbitrary output switch. Alternatively, if there exists available links from an arbitrary input switch to a number of middle switches at least one of these middle switches has an available link to any arbitrary output switch. It also means when m>=2*n−1, from any arbitrary input switch if there exists available links to a number of middle switches, all output switches have available links from at least one of those middle switches.

To prove that the network is rearrangeably nonblocking for multicast assignments, applicant notes that it is necessary and sufficient to prove the following two conditions: 1) There are enough middle switches to fan out each connection at most twice in the input switch; 2) From an arbitrary input switch, there always exist at least two middle switches with available links between these two middle switches and the input switch such that there are available links to all the destination output switches, of any connection request (e.g. All output switches in case of a broadcast connection request), from these two middle switches.

To prove the condition 1, applicant observes that there are enough middle switches if each connection is fanned out at most twice since m>=2*n. Moreover applicant provides proof for the condition 2 by contradiction as follows. In the worst-case scenario, suppose all the r output switches have (n−1) outlet links already connected. Now suppose from the given input switch all the output switches have to be reached for the nth outlet link.

Suppose there are not at least two middle switches available through which there are available links from the given input switch to all the output switches. If it happens, then each of the middle switches will have $$\left(\frac{r}{2}+1\right)$$

second internal links already in use. i.e., total second internal links used in all the middle switches is given by, $$\left(\frac{r}{2}+1\right)*(2*n) = n*r + 2*n$$

Which is not possible because the maximum possible second internal links in use is n*r.

So there always exist at least two middle switches through which there are paths from any given input switch to all the output switches. Since the number of middle switches m=2*n is sufficient to set up the multicast connections, the V(m,n,r) Clos network can be operated in rearrangeably nonblocking manner. Hence, if m>=2*n, the V(m,n,r) Clos network can be operated in rearrangeably nonblocking manner for multicast connections of any arbitrary fan-out.

TABLE 4

A multicast assignment in a V(10, 5, 25) Network

| Requests for r = 1 | Requests for r = 2 | Requests for r = 3 |
|---|---|---|
| $I_1$ = {1, 2, 3, 4, 5}, | $I_6$ = {1, 6, 11, 16, 21}, | $I_{11}$ = {1, 7, 13, 19, 25}, |
| $I_2$ = {6, 7, 8, 9, 10}, | $I_7$ = {2, 7, 12, 17, 22}, | $I_{12}$ = {2, 8, 14, 20, 21}, |
| $I_3$ = {11, 12, 13, 14, 15}, | $I_8$ = {3, 8, 13, 18, 23}, | $I_{13}$ = {3, 9, 15, 16, 22}, |
| $I_4$ = {16, 17, 18, 19, 20}, | $I_9$ = {4, 9, 14, 19, 24}, | $I_{14}$ = {4, 10, 11, 17, 23}, |
| $I_5$ = {21, 22, 23, 24, 25}, | $I_{10}$ = {5, 10, 15, 20, 25}, | $I_{15}$ = {5, 6, 12, 18, 24}, |

| Requests for r = 4 | Requests for r = 5 |
|---|---|
| $I_{16}$ = {1, 8, 15, 17, 24}, | $I_{21}$ = {1, 9, 12, 20, 23}, |
| $I_{17}$ = {2, 9, 11, 18, 25}, | $I_{22}$ = {2, 10, 13, 16, 24}, |
| $I_{18}$ = {3, 10, 12, 19, 21}, | $I_{23}$ = {3, 6, 14, 17, 25}, |
| $I_{19}$ = {4, 6, 13, 20, 22}, | $I_{24}$ = {4, 7, 15, 18, 21}, |
| $I_{20}$ = {5, 7, 14, 16, 23}, | $I_{25}$ = {5, 8, 11, 19, 22} |

Table 4 shows an exemplary multicast assignment in a V(10,5,25) network. Each request has a fan-out of five. All the outlet links are connected in this multicast assignment since each output switch is used exactly five times in the requests corresponding to five outlet links of each output switch. In one implementation, Table 5 shows by using only m=2*n=10 middle switches, the multicast assignment can be set up to operate the network in rearrangeably nonblocking manner.

TABLE 5

A rearrangeably nonblocking Schedule of the Multicast assignment of Table 4

| | M = 1 | M = 2 | M = 3 | M = 4 | M = 5 | M = 6 | M = 7 | M = 8 | M = 9 | M = 10 |
|---|---|---|---|---|---|---|---|---|---|---|
| R = 1 | 1, 2 | 3, 4, 5 | 6, 7 | 8, 9, 10 | 11, 12 | 13, 14, 15 | 16, 17 | 18, 19, 20 | 21, 22 | 23, 24, 25 |
| R = 2 | 6, 11, 16, 21 | 1 | 2, 12, 17, 22 | 7 | 3, 8 | 4, 9, 19, 24 | 13, 18, 23 | 14 | 5, 10, 25 | 15, 20 |
| R = 3 | 7, 13, 19, 25 | 2, 8 | 1 | 14, 20, 21 | 9, 15, 16, 22 | 3 | 4, 10, 11 | 17, 23 | 6, 12, 18, 24 | 5 |
| R = 4 | 8, 15, 17, 24 | 9, 11, 18, 25 | 5 | 1 | 2 | 12 | 6, 20, 22 | 4, 13 | 7, 14, 16, 23 | 3, 10, 19, 21 |
| R = 5 | 9, 12, 20, 23 | 10, 13, 16, 24 | 3, 14, 25 | 2 | 1 | 6, 17 | 7, 15, 21 | 5, 8, 11, 22 | 19 | 4, 18 |

Each row in Table 5 represents an input switch and each column represents a middle switch. And each element in the table represents the list of output switches set up through the corresponding middle switch for a connection originating from the corresponding input switch. The correspondence between different connections from the same row of Table 5 and hence from the same input switch can be obtained from the multicast assignment of the Table 4.

To extend the proof (described above), applicant now shows that $V(m,n_1,r_1,n_2,r_2)$ network can be operated in rearrangeably nonblocking manner for multicast connections when $m >= n_1+n_2$, by considering the two cases $n_1 < n_2$ and $n_1 > n_2$.

1) $n_1 < n_2$: In this case, the number of middle switches necessary is $2*n_1$ which is $<(n_1+n_2)$. To prove the sufficiency, even though there are a total of $n_2*r_2$ outlet links in the network, in the worst-case scenario only $n_1*r_2$ second internal links will be needed. This is because, even if all $n_2*r_2$ outlet links are destinations of the connections, using the fan-out capability in the output switches the rearrangeably nonblocking behavior can be realized. And so $2*n_1$ which is $<(n_1+n_2)$ middle switches is sufficient.

2) $n_1 > n_2$: In this case, since there are a total of $n_2*r_2$ outlet links in the network, only a maximum of $n_2*r_2$ second internal links will be used even if all the $n_2*r_2$ outlet links are destinations of the network connections. When the number of middle switches is $n_1+n_2$ the total second internal links in the network is given by $r_2*(n_1+n_2)$ which is more than the required number, according to the rearrangeability proof for $V(m,n,r)$ as shown earlier, which is $r_2*(2*n_2)$. Also from any input switch only a maximum of $n_2$ out of $n_1$ available inlet links can each have fan-out of $r_2$. And so only a maximum of $n_2$ connections from any input switch need to be fanned out into two. And so $n_1+n_2$ middle switches are sufficient.

Figure 8A:
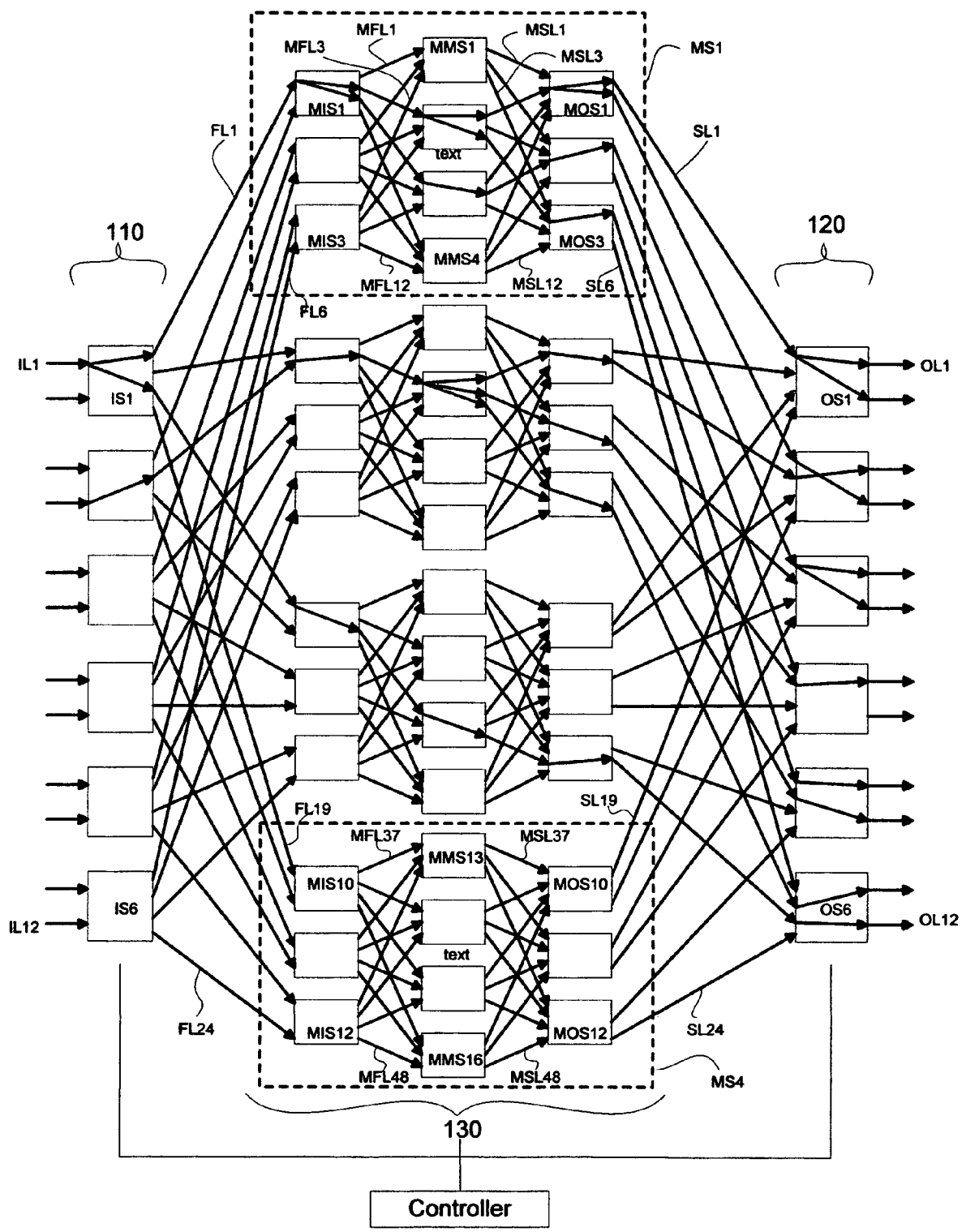
FIG. 8A is a diagram of an exemplary three-stage network where the middle stage switches are each three-stage networks.

Referring to FIG. 8A a five stage rearrangeably nonblocking network is shown according to an embodiment of the present invention that uses recursion as follows. The five stage network comprises input stage 110 and output stage 120, with inlet links IL1-IL12 and outlet links OL1-OL12 respectively, where input stage 110 consist of six, two by four switches IS1-IS6, and output stage 120 consist of six, four by two switches OS1-OS6. However, unlike the single switches of middle stage 130 of the three-stage network of FIG. 1A, the middle stage 130 of FIG. 8A consists of four, six by six three-stage subnetworks MS1-MS4 (wherein the term "subnetwork" has the same meaning as the term "network"). Each of the four middle switches MS1-MS4 are connected to each of the input switches through six first internal links (for example the links FL1-FL6 connected to the middle switch MS1 from each of the input switch IS1-IS6), and connected to each of the output switches through six second internal links (for example the links SL1-SL6 connected from the middle switch MS1 to each of the output switch OS1-OS6). In one embodiment, the network also includes a controller coupled with the input stage 110, output stage 120 and middle stage subnetworks 130 to form connections between an inlet link IL1-IL6 and an arbitrary number of outlet links OL1-OL6.

Each of middle switches MS1-MS4 is a $V(4,2,3)$ three-stage subnetwork. For example, the three-stage subnetwork MS1 comprises input stage of three, two by four switches MIS1-MIS3 with inlet links FL1-FL6, and an output stage of three, four by two switches MOS1-MOS3 with outlet links SL1-SL6. The middle stage of MS1 consists of four, three by three switches MMS1-MMS4. Each of the middle switches MMS1-MMS4 are connected to each of the input switches MIS1-MIS3 through three first internal links (for example the links MFL1-MFL3 connected to the middle switch MMS1 from each of the input switch MIS1-MIS3), and connected to each of the output switches MOS1-MOS3 through three second internal links (for example the links MSL1-MSL3 connected from the middle switch MMS1 to each of the output switch MOS1-MOS3). In similar fashion the number of stages can increase to 7, 9, etc.

As with the three-stage network, the network of FIG. 8A has the property of being operable in rearrangeably nonblocking manner as described herein with no more than 2*n middle stage three-stage networks. In the network of FIG. 8A the middle stage requires no more than 2*n three-stage subnetworks. Thus in FIG. 8A where n equals 2, middle stage 130 has four middle stage three-stage subnetworks MS1-MS4. Furthermore, according to the present invention, each of the middle stage subnetworks MS1-MS4 require no more than $k_1+k_2$ middle switches MMS1-MMS4, where $k_1$ is the number of inlet links for each middle input switch MIS1-MIS3 and $k_2$ is the number of outlet links for each middle output switch MOS1-MOS3.

In general, according to certain embodiments, one or more of the switches, in any of the first, middle and last stages can be recursively replaced by a three-stage subnetwork with no more than $n_1+n_2$ middle stage switches where $n_1$ is the number of inlet links to each first stage switch in the subnetwork and $n_2$ is the number of outlet links to each last stage switch of the subnetwork for rearrangeably nonblocking operation, for multicast connections of arbitrary fan-out. Note that because the term "subnetwork" has the same meaning as "network", the just described replacement can be repeated recursively, as often as desired, depending on the embodiment.

It should be understood that the methods, discussed so far, are applicable to k-stage networks for k>3 by recursively using the design criteria developed on any of the switches in the network. The presentation of the methods in terms of three-stage networks is only for notational convenience. That is, these methods can be generalized by recursively replacing each of a subset of switches (at least 1) in the network with a smaller three-stage network, which has the same number of total inlet links and total outlet links as the switch being replaced. For instance, in a three-stage network, one or more switches in either the input, middle or output stages can be replaced with a three-stage network to expand the network. If, for example, a five-stage network is desired, then all middle switches (or all input switches or all output switches) are replaced with a three-stage network.

In accordance with the invention, in any of the recursive three-stage networks each connection can fan out in the first stage switch into at most two middle stage subnetworks, and in the middle switches and last stage switches it can fan out any arbitrary number of times as required by the connection request. For example as shown in the network of FIG. 8A, connection $I_1$ fans out in the first stage switch IS1 twice into middle stage subnetworks MS1 and MS3. In middle stage subnetwork MS1 it fans out four times into output switches OS1, OS2, OS3 and OS5. However in the three-stage subnetwork of MS1, it can fan out at most twice in the first stage, for example connection $I_1$ fans out twice in the input switch MIS1 into middle switches MMS1 and MMS3 of the three-stage subnetwork of MS1. Similarly a connection can fan out arbitrary number of times in the middle and last stages of any three-stage network. For example connection $I_1$ fans out twice in middle switch MMS2 into output switches MOS1 and MOS3 of three-stage subnetwork of MS1. Also the connection $I_1$ fans out in MMS3 once into MOS2 and from there once into OS3. The connection $I_4$ fans out once into three stage network once where it is fanned out three times into output switches OS2, OS4, and OS6. The connection $I_4$ fans out once in MIS4 into MMS6 where it fans out three times into output switches MOS4, MOS5, and MOS6 of the three-stage subnetwork MS2.

Figure 8B:
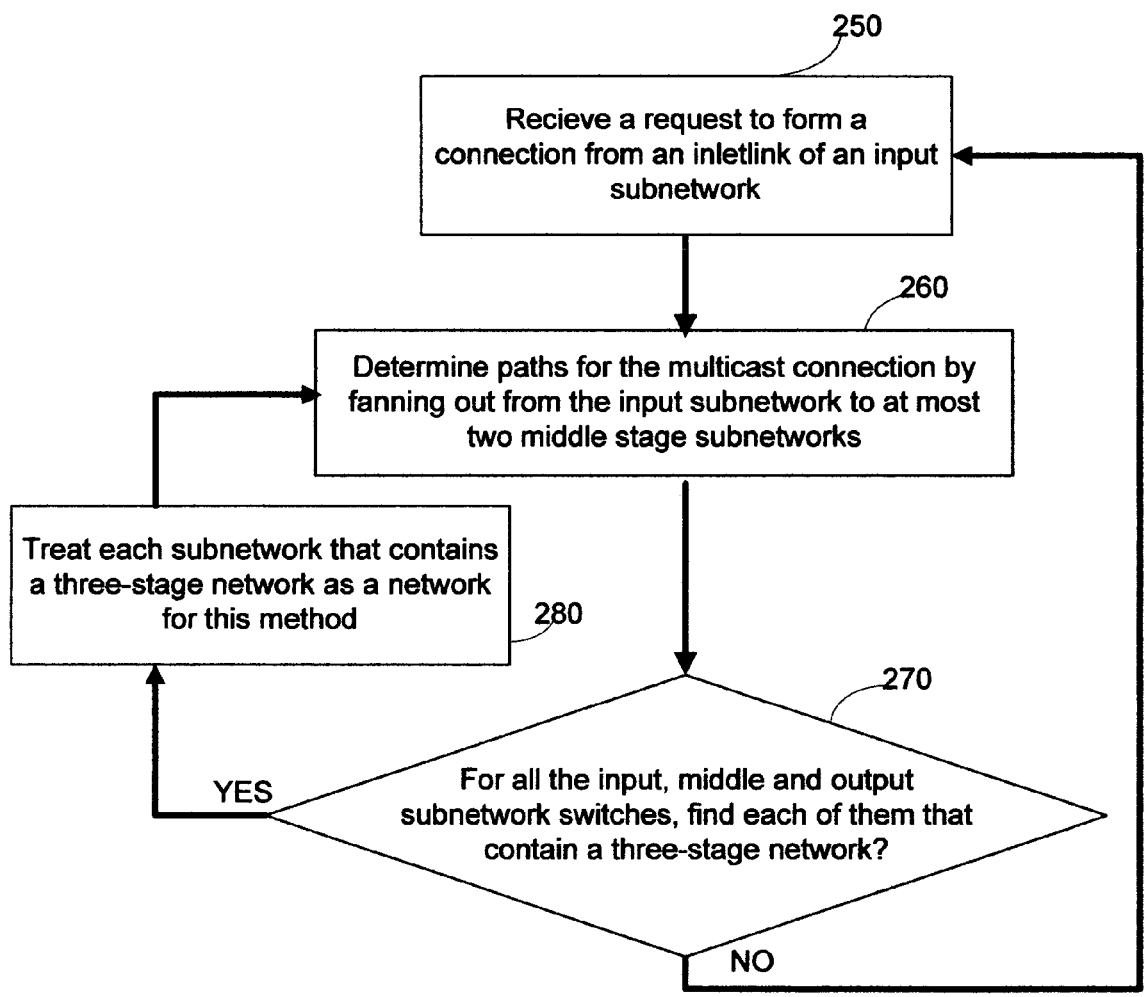
FIG. 8B is high-level flowchart, in one embodiment, of a recursively rearrangeable scheduling method in a recursively large multi-stage network such as the network in FIG. 8A.

FIG. 8B shows a high-level flowchart of a scheduling method, in one embodiment executed by the controller of FIG. 8A. The method of FIG. 8B is used only for networks that have three stages each of which may be in turn composed of three-stage subnetworks, in a recursive manner as described above in reference to FIG. 8A. According to this embodiment, a multicast connection request is received in act 250 (FIG. 8B). Then a connection to satisfy the request is set up in act 260 by fanning out into at most two middle stage subnetworks from its input switch. Then the control goes to act 270. Act 270 recursively goes through each subnetwork contained in the network. For each subnetwork found in act 270 the control goes to act 280 and each subnetwork is treated as a network and the scheduling is performed similarly. Once all the recursive subnetworks are scheduled the control transfers from act 270 to act 250 so that each multicast connection will be scheduled in the same manner in a loop. It must be noted that even though FIG. 8A does not explicitly show the rearrangement method, when the scheduling method 260 fails to set up the connection, similar to the method of FIG. 5A, the above described rearrangement method is performed for each network, before recursively scheduling each subnetwork found in act 270.

Figure 9A:
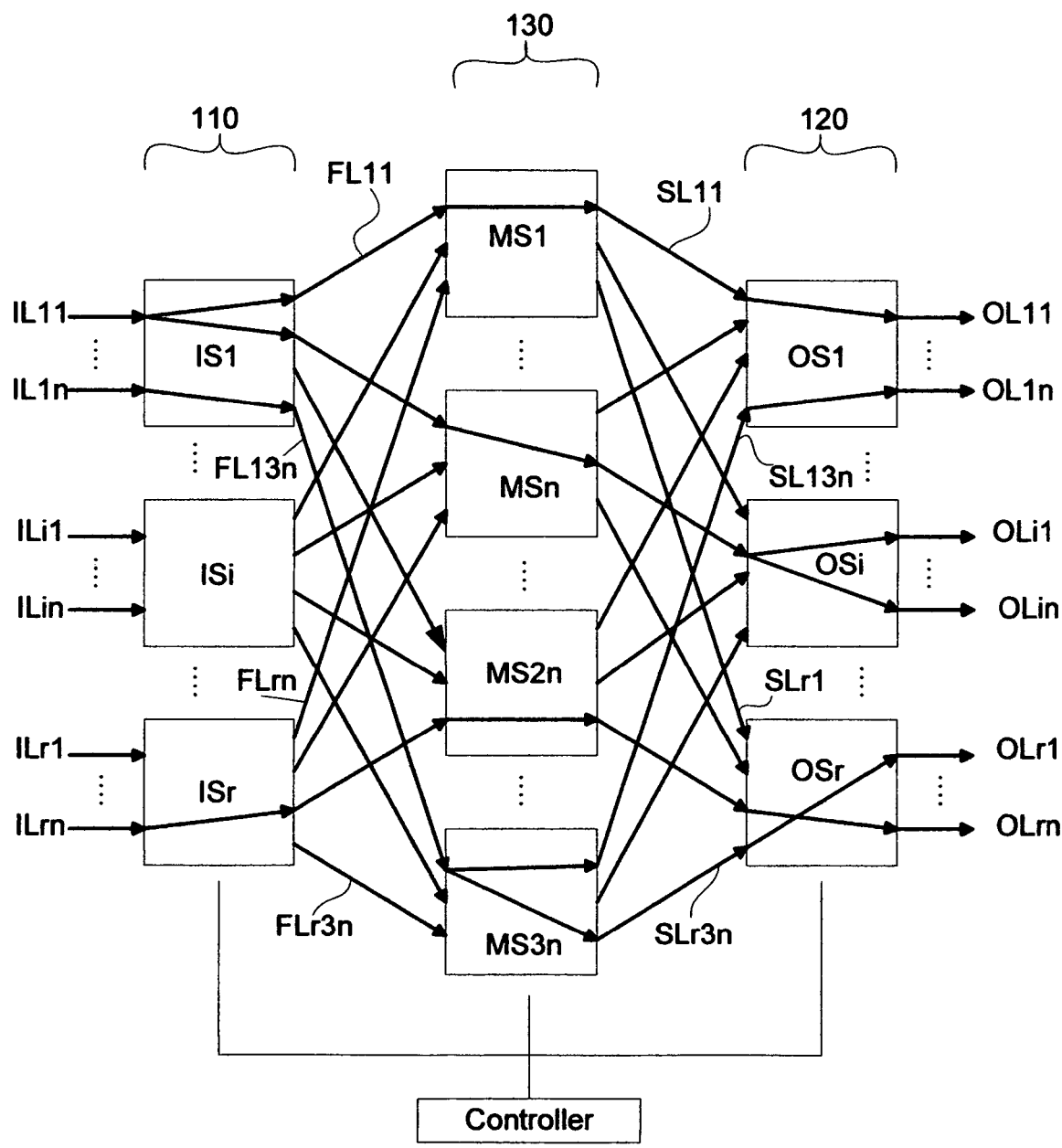
FIG. 9A is a diagram of a general symmetrical three-stage network with n inlet links in each of r input stage switches and m=3*n middle stage switches.
Figure 9B:
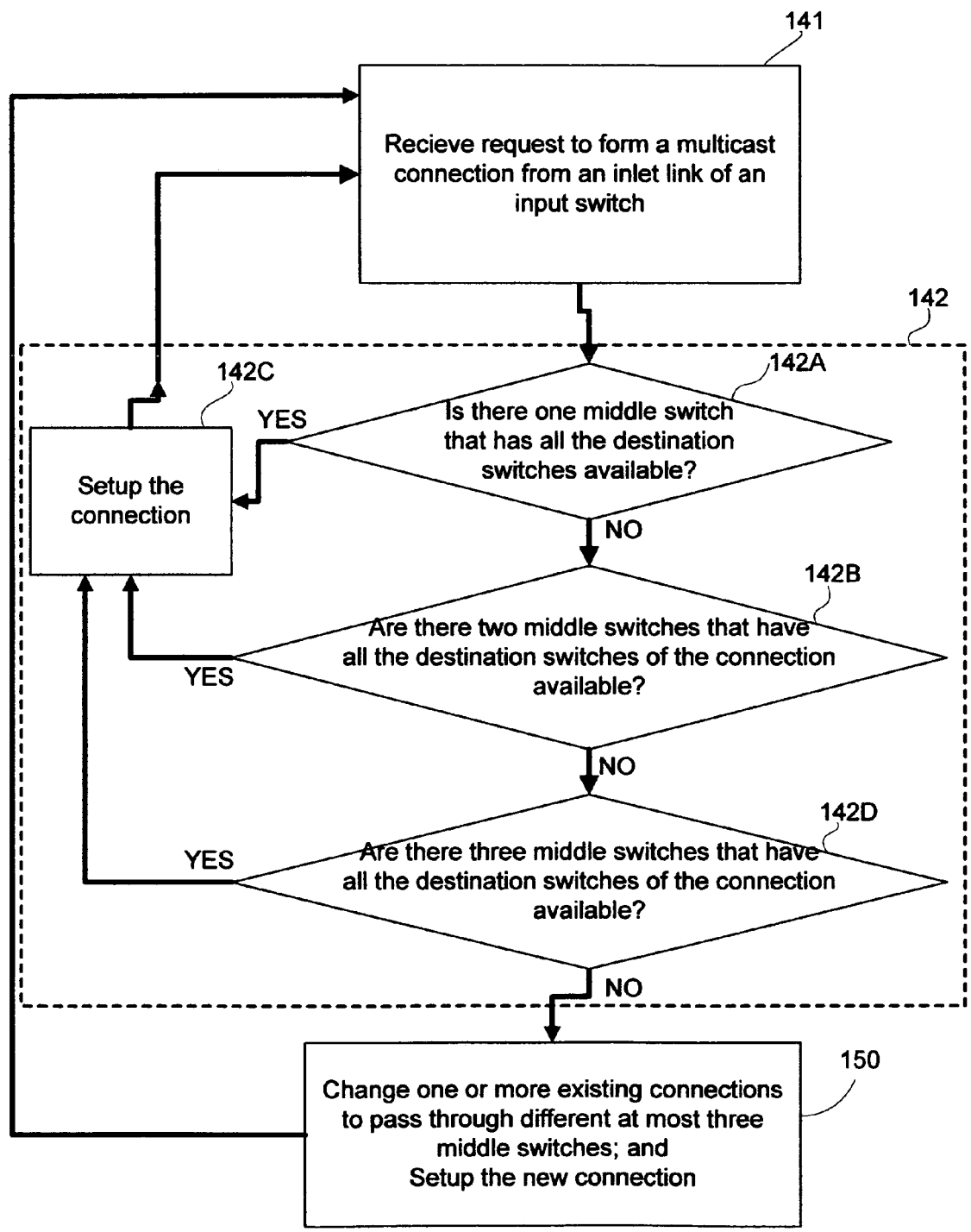
FIG. 9B is high-level flowchart, in one embodiment, of a rearrangeable scheduling method used to set up multicast connections the network of FIG. 9A, according to the invention.

A direct extension of the foregoing discussion is that when the number of middle switches is increased, the above-described methods can be changed to improve speed or to reduce the frequency of rearrangement. For example when m=3*n, each multicast connection can be fanned out into at most three middle switches and the V(m,n,r) network can be operated in rearrangeably nonblocking manner. Similarly, when m=2*$n_1$+$n_2$, the V(m,$n_1$,$r_1$,$n_2$,$r_2$) network is operated in rearrangeably nonblocking manner if each multicast connection is fanned out into at most three middle switches. FIG. 9A shows a general symmetrical multi-stage network with m=3*n middle switches. Excepting for the middle switches to be m=3*n, the description of FIG. 9A is similar to FIG. 2A. FIG. 9B shows the scheduling method by fanning out into at most three middle switches. Excepting for the additional act 142D of testing for three middle switches and setting up a connection through three middle switches in act 142C, the description of the method of FIG. 9B is similar to the method of FIG. 5A.

The just-described method of FIG. 9B can be used in conjunction with the method of FIG. 5A, e.g. to use a fan-out of at most two in setting up some connections and fan-out of at most three in setting up other connections. Such a combined method may be used, for example if there are m=2*n+k middle stage switches where 0<k<n, and initially fan-out of two is attempted without rearrangement followed by fan-out of three followed by the rearrangement method 150.

Figure 10A:
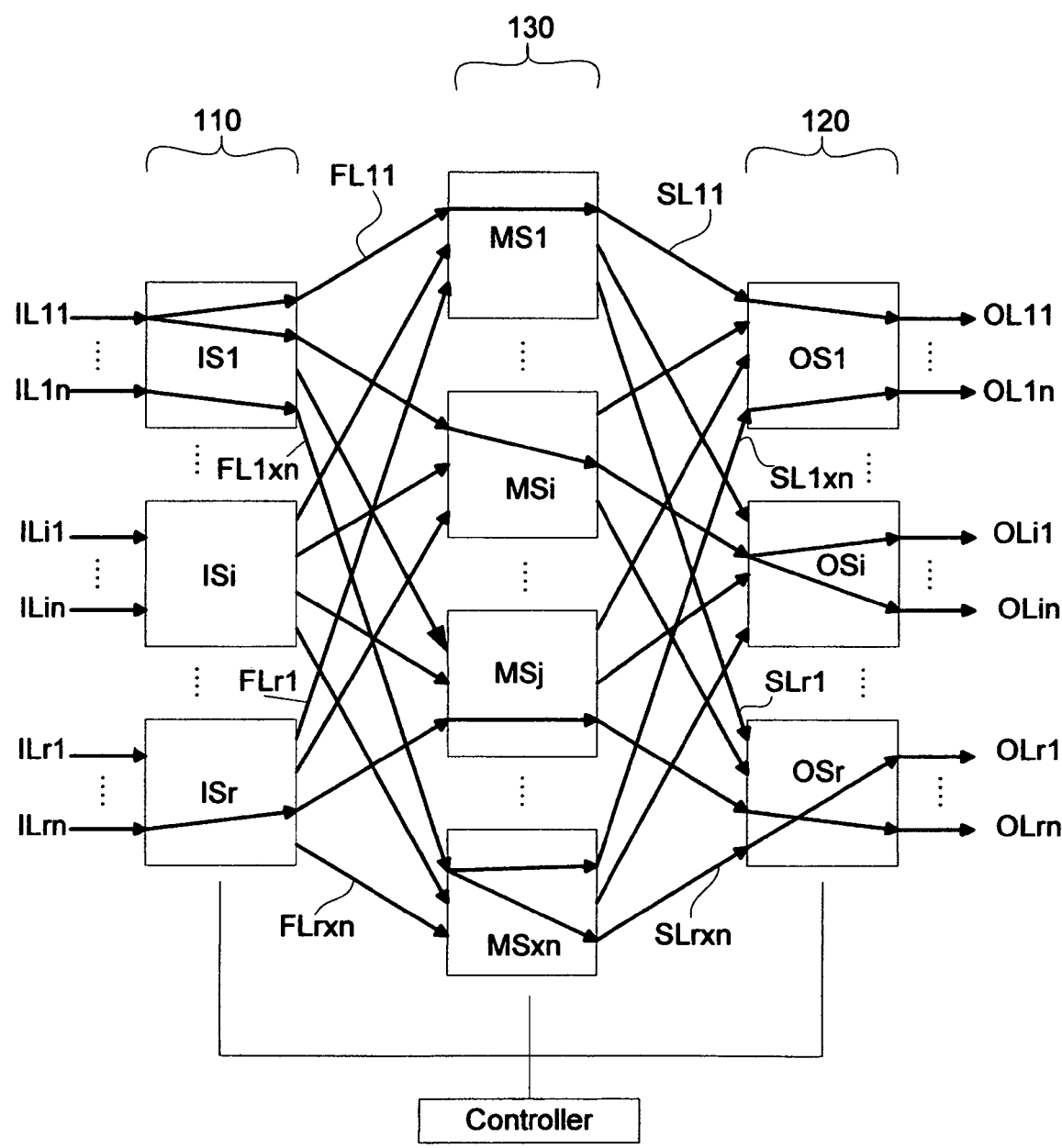
FIG. 10A is a diagram of a general symmetrical three-stage network with n inlet links in each of r input stage switches and m=x*n middle stage switches for x≧2.
Figure 10B:
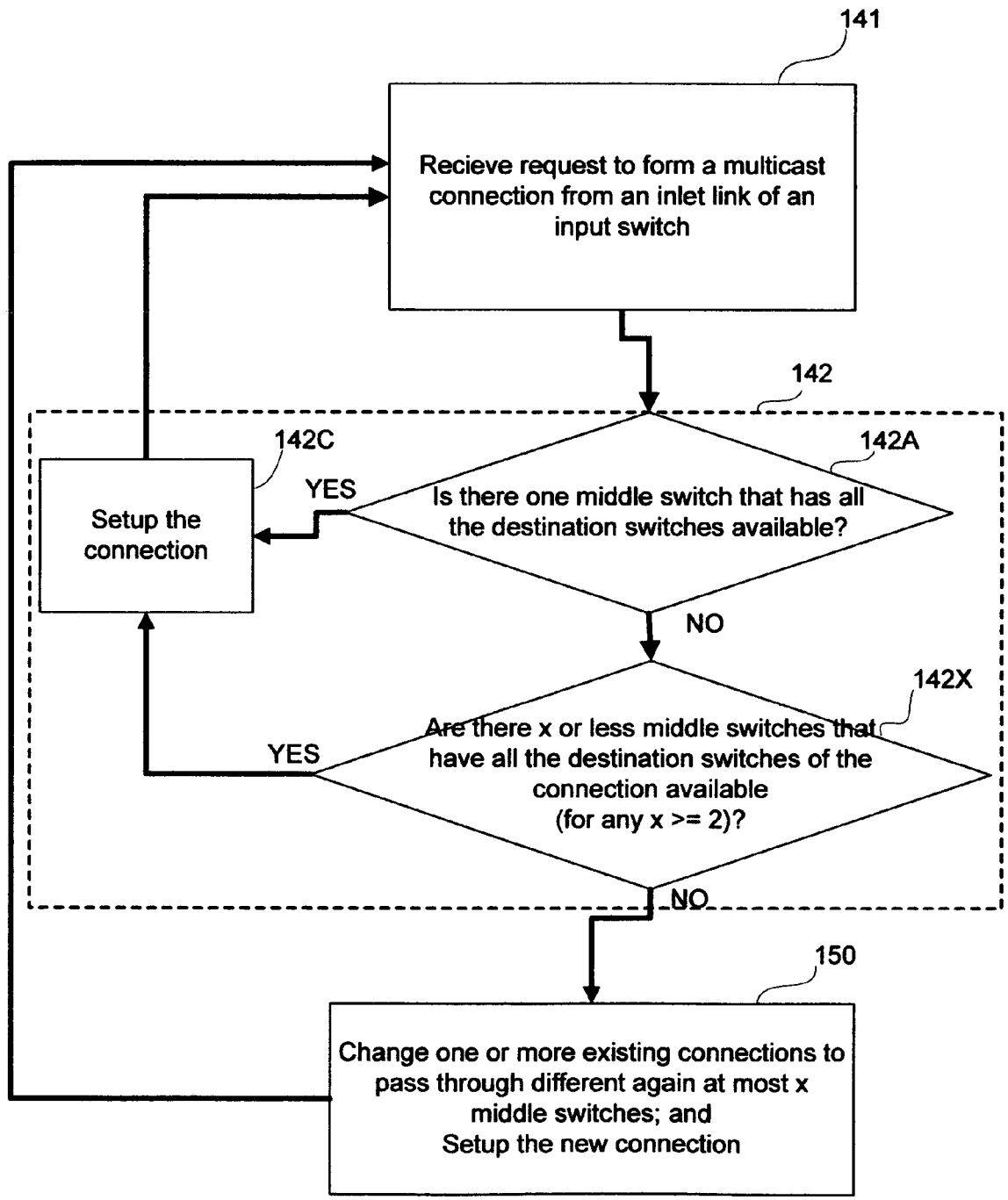
FIG. 10B is high-level flowchart, in one embodiment, of a rearrangeable scheduling method used to set up multicast connections in the network of FIG. 10A, according to the invention.

In general when m=x*n and x≧2 each multicast connection can be fanned out into at most x middle switches and the V(m,n,r) network is operated in rearrangeably nonblocking manner. Similarly, when m=(x−1)*$n_1$+$n_2$, V(m,$n_1$,$r_1$,$n_2$,$r_2$) network is operated in rearrangeably nonblocking manner if each multicast connection is fanned out into at most x middle switches. FIG. 10A shows a general symmetrical multi-stage network with m=x*n middle switches. Excepting for the middle switches to be m=x*n, the description of FIG. 10A is similar to FIG. 2A. FIG. 10B shows the scheduling method by fanning out into at most x middle switches. Excepting for the additional act 142X of testing for x middle switches and setting up a connection through x middle switches in act 142C, the description of the method of FIG. 10B is similar to the method of FIG. 5A.

In an alternative embodiment, when m≧$x_1$*$a_1$+$x_2$*$a_2$+ . . . +$x_p$*$a_p$, where $a_1$+$a_2$+ . . . +$a_p$=$n_1$+$n_2$ the V(m,$n_1$,$r_1$,$n_2$,$r_2$) network is operated in rearrangeably nonblocking manner as described herein, when multicast connections are set up such that connections from $a_i$ inlet links of each input switch pass through at most $x_i$ middles switches, for 1≦i≦p.

Also another embodiment has m middle stage switches where m=2*n−2*k, with n being the number of inlet links for each input switch, and at most k connections from each input switch are blocked when the rearrangeable scheduling method 140 of FIG. 1B is used in the network of FIG. 2A. For example if $$k = \frac{n}{2},$$

only half of the middle switches required for a rearrangeably nonblocking network are present and in such a network at most $$\frac{n}{2}$$

connections from each input switch are set up using the method of FIG. 1B and any additional connections are dropped. Specifically, when $$\frac{n}{2}$$

connections are already formed, at most n middle switches have been used from each input switch and so no more middle switches are available. Under certain circumstances fewer than k connections are blocked when using method 140, for example if fan-out of less than two is used to set up some of the existing connections. In yet another embodiment, when m=$n_1$+$n_2$−2*k, at most k connections from each input switch will be blocked from each input switch when the rearrangeable scheduling method 140 of FIG. 1B is used in the network of FIG. 2B.

Numerous modifications and adaptations of the embodiments, implementations, and examples described herein will be apparent to the skilled artisan in view of the disclosure.

For example in one embodiment of a V(m,n,r) network, one or more new connections that are in the process of being set up, are dropped (disconnected permanently) if it takes longer than a predetermined amount of time to compute the rearrangement of the existing connections as described in reference to act 150 of the rearrangeable scheduling method 140 of FIG. 5A. In another example of this embodiment, one of the existing connections is dropped to set up the new connection so that the computation time to setup the new connection by rearrangement of the existing connections is reduced.

For example, in one embodiment a method of the type described above is modified as follows when the number of output switches $r_2$ is less than or equal to four. Specifically, a three-stage network is operated in strictly nonblocking manner when the multicast connection is fanned out only once in the input stage, with m number of middle stage switches where $m \geq \lfloor \sqrt{r_2} \rfloor * MIN(n_1, n_2)$ when $\lfloor \sqrt{r_2} \rfloor$ is >1 and odd, or when $\lfloor \sqrt{r_2} \rfloor = 2$, $m \geq (\lfloor \sqrt{r_2} \rfloor - 1) * MIN(n_1, n_2)$ when $\lfloor \sqrt{r_2} \rfloor$ is >2 and even, and $m \geq n_1 + n_2 - 1$ when $\lfloor \sqrt{r_2} \rfloor = 1$. So when $r_2$ is less than or equal to four a three-stage network is operated in strictly nonblocking manner for $m \leq 2*n$.

For example, in another embodiment, a method of the type described above is modified to set up a multirate multi-stage network as follows. Specifically, a multirate connection can be specified as a type of multicast connection. In a multicast connection, an inlet link transmits to multiple outlet links, whereas in a multirate connection multiple inlet links transmit to a single outlet link when the rate of data transfer of all the paths in use meet the requirements of multirate connection request. In such a case a multirate connection can be set up (in a method that works backwards from the output stage to the input stage), with fan-in (instead of fan-out) of not more than two in the output stage and arbitrary fan-ins in the input stages and middle stages. And a three-stage multirate network is operated in rearrangeably nonblocking manner with the exact same requirements on the number of middle stage switches as described above for certain embodiments.

Numerous such modifications and adaptations are encompassed by the attached claims.

What is claimed is:

1. A network, comprising:
    an input stage including $r_1$ input switches, each including $n_1$ inlet links;
    an output stage including $r_2$ output switches, each including $n_2$ outlet links;
    a middle stage including m middle switches, each of the m middle switches including $r_1$ first internal links connected to respective ones of the $r_1$ input switches, each of the m middle switches further including $r_2$ second internal links connected to respective ones of the $r_2$ output switches; and
    a controller connected to the input stage, the output stage, and the middle stage, the controller being configured to set up multicast connections between the input stage and the output stage, such that each of the multicast connections is fanned out from the input stage into at most x of the m middle switches, wherein x<m, and x is defined based on the formula:

$$m = (x-1) * n_1 + n_2.$$

2. The network of claim 1, wherein the controller is configured to set up the multicast connections in a rearrangeably nonblocking manner.

3. The network of claim 2, wherein the controller is configured to set up at least one of the multicast connections by rearranging a remaining one of the multicast connections.

4. The network of claim 1, wherein x is 2.

5. The network of claim 4, wherein each of the multicast connections is connected through at most 2 of the m middle switches.

6. The network of claim 1, wherein x is 3.

7. The network of claim 6, wherein each of the multicast connections is connected through at most 3 of the m middle switches.

8. The network of claim 1, wherein $n_1 = n_2$.

9. The network of claim 1, wherein $r_1 = r_2$.

10. A network, comprising:
    a controller configured to:
        define a fan-out x from an input stage of the network into a middle stage of the network, the input stage including $r_1$ input switches, each including $n_1$ inlet links, the middle stage including m middle switches; and
        set up multicast connections between the input stage and an output stage of the network, such that each of the multicast connections is connected through at most x of the m middle switches, the output stage including $r_2$ output switches, each including $n_2$ outlet links, where x<m, and x is defined based on the formula: $m = (x-1) * n_1 + n_2$.

11. The network of claim 10, wherein the controller is configured to set up the multicast connections in a rearrangeably nonblocking manner.

12. The network of claim 11, wherein the controller is configured to set up at least one of the multicast connections by rearranging a remaining one of the multicast connections.

13. The network of claim 10, wherein each of the m middle switches includes $r_1$ first internal links connected to respective ones of the $r_1$ input switches, and each of the m middle switches further includes $r_2$ second internal links connected to respective ones of the $r_2$ output switches.

14. The network of claim 10, wherein x is 2.

15. The network of claim 14, wherein each of the multicast connections is connected through at most 2 of the m middle switches.

16. The network of claim 10, wherein x is 3.

17. The network of claim 16, wherein each of the multicast connections is connected through at most 3 of the m middle switches.

18. The network of claim 10, wherein $n_1 = n_2$, and $r_1 = r_2$.

* * * * *